US012775420B2

(12) United States Patent
Seok et al.

(10) Patent No.: US 12,775,420 B2
(45) Date of Patent: Oct. 27, 2026

(54) NON-VOLATILE MEMORY AND STORAGE DEVICE INCLUDING THE SAME

(71) Applicant: Samsung Electronics Co., Ltd., Suwon-si (KR)

(72) Inventors: Junyeong Seok, Suwon-si (KR); Myungkyu Kim, Suwon-si (KR); Eun Chu Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/907,945

(22) Filed: Oct. 7, 2024

(65) Prior Publication Data

US 2025/0244917 A1 Jul. 31, 2025

(30) Foreign Application Priority Data

Jan. 30, 2024 (KR) ........................ 10-2024-0014355

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
USPC .......................................................... 711/154
See application file for complete search history.

(56) References Cited

U.S. PATENT DOCUMENTS 7,039,788 B1 * 5/2006 Chang ................. G06F 12/0246 711/155
7,804,718 B2 9/2010 Kim
8,438,325 B2 5/2013 Reid et al.
8,670,275 B2 * 3/2014 Confalonieri .......... G11C 16/16 365/185.11
9,190,155 B2 11/2015 Lee et al.
9,652,381 B2 5/2017 Higgins et al.
11,404,122 B2 8/2022 Chibvongodze et al.
11,461,227 B2 10/2022 You
11,646,081 B2 5/2023 Yang et al.
2008/0307158 A1 * 12/2008 Sinclair ............... G06F 12/0246 711/E12.008

(Continued)

FOREIGN PATENT DOCUMENTS

CN 114138189 A 3/2022
JP 2021-007058 A 1/2021
KR 10-2024-0094058 A 6/2024

OTHER PUBLICATIONS

Extended European Search Report for European Application No. 24223770.9, dated Jun. 27, 2025.

*Primary Examiner* — Gautam Sain
(74) *Attorney, Agent, or Firm* — Wolf, Greenfield & Sacks, P.C.

(57) ABSTRACT

A memory device includes a plurality of sub-blocks having different sizes and arranged in a vertical direction above a substrate, wherein a first sub-block and a second sub-block among the plurality of sub-blocks each includes a normal region and a reserved region configured to store data after at least some pieces of data stored in the normal region are invalidated, a third sub-block among the plurality of sub-blocks has a smallest size among the different sizes, and a size of the normal region of each of the first sub-block and the second sub-block is equal to or less than the size of the third sub-block.

20 Claims, 21 Drawing Sheets

(56) References Cited

U.S. PATENT DOCUMENTS

| | | | | |
|---|---|---|---|---|
| 2016/0118125 | A1* | 4/2016 | Ravimohan | G11C 16/0483<br>365/185.11 |
| 2017/0277471 | A1* | 9/2017 | Huang | G06F 3/0685 |
| 2020/0409836 | A1* | 12/2020 | You | G06F 12/0261 |
| 2021/0149598 | A1* | 5/2021 | Choi | G06F 3/0679 |
| 2024/0168669 | A1 | 5/2024 | Oh et al. | |

* cited by examiner

NON-VOLATILE MEMORY AND STORAGE DEVICE INCLUDING THE SAME

CROSS-REFERENCE TO RELATED APPLICATIONS

This application is based on and claims priority under 35 U.S.C. § 119 to Korean Patent Application No. 10-2024-0014355, filed on Jan. 30, 2024, in the Korean Intellectual Property Office, the disclosure of which is incorporated by reference herein in its entirety.

BACKGROUND OF THE INVENTION

The inventive concept relates to a memory device, and more particularly, to a non-volatile memory device including memory stacks having different sizes.

As non-volatile memory devices are required to have higher capacities and smaller sizes, the number of word lines stacked on a substrate may increase and the size of the memory block may also increase. As the size of the memory block increases, the memory block may be divided into at least two sub-blocks and an erase operation may be performed on each of the sub-blocks. Also, if the sizes of at least two sub-blocks are different from each other, many resources may be required to perform the erase operation on each of the sub-blocks. In addition, management to perform garbage collection and wear leveling may become difficult and the complexity of firmware may also increase. Accordingly, the performance of a storage device may deteriorate.

SUMMARY OF THE INVENTION

The inventive concept provides a non-volatile memory device and a storage device, which improve operating efficiency for non-volatile memory including sub-blocks of different sizes.

According to an aspect of the inventive concept, there is provided a non-volatile memory device including a plurality of sub-blocks having different sizes and arranged in a vertical direction above a substrate, wherein a first sub-block and a second sub-block among the plurality of sub-blocks each includes a normal region and a reserved region configured to store data after at least some pieces of data stored in the normal region are invalidated, a third sub-block among the plurality of sub-blocks has a smallest size among the different sizes, and a size of the normal region of each of the first sub-block and the second sub-block is equal to or less than the size of the third sub-block.

According to another aspect of the inventive concept, there is provided a storage device including a non-volatile memory including a plurality of sub-blocks having different sizes, wherein each of the plurality of sub-blocks includes a normal region and a reserved region and a storage controller configured to manage a number of valid pages in a first sub-block among the plurality of sub-blocks to be less than or equal to a total number of pages in a second sub-block having a smallest size among the plurality of sub-blocks.

According to another aspect of the inventive concept, there is provided a non-volatile memory device including a plurality of stacks having different sizes and arranged in a vertical direction above a substrate, wherein each of at least some of the plurality of stacks includes a first storage region and a second storage region configured to store data if at least some pieces of data stored in the first storage region are invalidated, and the first storage region does not include an erase state storage region, a first stack among the plurality of stacks has a smallest size, and a size of the first storage region in each stack among the at least some of the plurality of stacks, different from the first stack, is less than or equal to the size of the first stack.

BRIEF DESCRIPTION OF THE DRAWINGS

Embodiments will be more clearly understood from the following detailed description taken in conjunction with the accompanying drawings in which.

DETAILED DESCRIPTION

Hereinafter, embodiments are described in detail with reference to the accompanying drawings.

Figure 1:
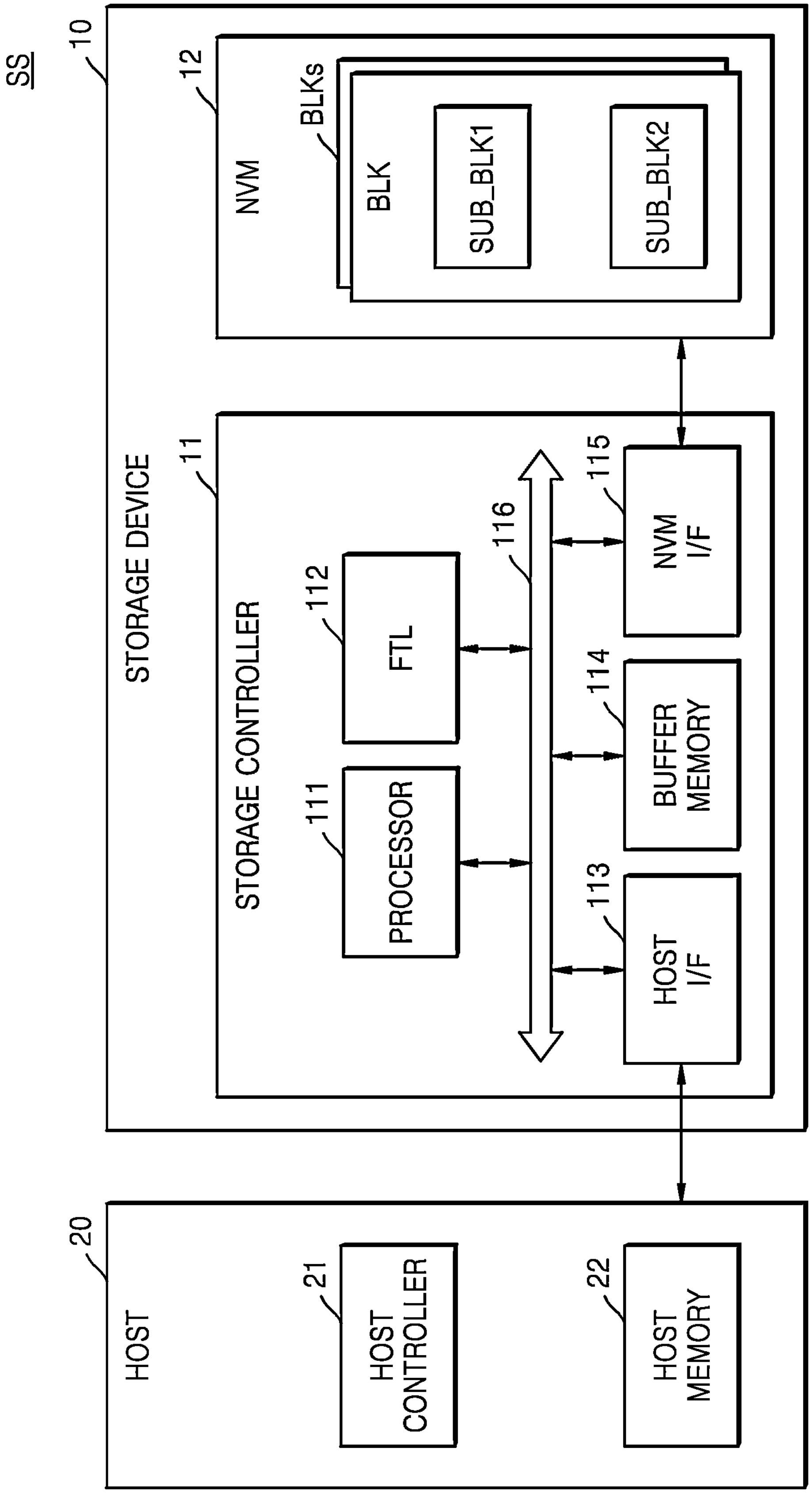
FIG. 1 is a block diagram showing a host-storage system according to an embodiment.

FIG. 1 is a block diagram showing a host-storage system SS according to an embodiment.

Referring to FIG. 1, the host-storage system SS may include a storage device 10 and a host 20, and the storage device 10 may include a storage controller 11 and a non-volatile memory (or simply referred to as an NVM) 12. According to an embodiment, the storage controller 11 may be referred to as a memory controller or a non-volatile memory controller. The non-volatile memory 12 may include a plurality of blocks BLKs, and each block BLK may include a plurality of sub-blocks having different block sizes. For example, the size of a sub-block may correspond to the number of word lines connected to the sub-block. For example, the size of a sub-block may correspond to the length of the sub-block in the vertical direction (e.g., VD in FIG. 4A). For example, the size of a sub-block may correspond to the number of physical pages in the sub-block. For example, the size of a sub-block may correspond to the size of data stored in the sub-block.

In an embodiment, the plurality of sub-blocks may include first and second sub-blocks SUB_BLK1 and SUB_BLK2. In an embodiment, an erase operation of the non-volatile memory 12 may be performed in a unit of a block or a sub-block. For example, in a first mode, an erase operation may be performed independently on each of the plurality of blocks BLKs. In other words, an erase operation may be performed in a unit of a block. For example, in a second mode, an erase operation may be performed independently on each of the plurality of sub-blocks. In other words, an erase operation may be performed in a unit of a sub-block.

In an embodiment, the first and second sub-blocks SUB_BLK1 and SUB_BLK2 may respectively correspond to first and second memory stacks (e.g., ST1 and ST2 in FIG. 6) arranged in the vertical direction above a substrate, and the block size may correspond to the stack size. For example, the stack size of the first memory stack may correspond to the vertical length of the first memory stack, and the stack size of the second memory stack may correspond to the vertical length of the second memory stack. In an embodiment, an erase operation of the non-volatile memory 12 may be performed in a unit of a block or a memory stack. For example, in a first mode, an erase operation may be performed independently on each of the plurality of blocks BLKs. In other words, an erase operation may be performed in a unit of a block. For example, in a second mode, an erase operation may be performed independently on each of the plurality of memory stacks. In other words, an erase operation may be performed in a unit of a memory stack.

The storage controller 11 may communicate with the non-volatile memory 12 and manage mapping tables for the first and second sub-blocks SUB_BLK1 and SUB_BLK2 of the non-volatile memory 12. Specifically, the storage controller 11 may include a processor 111, a flash translation layer (FTL) 112, a host interface 113, a buffer memory 114, and a non-volatile memory interface 115, which may communicate with each other via a bus 116.

The FTL 112 may set the data density of the memory cells of the first sub-block SUB_BLK1 to be the same value and set the data densities of the memory cells of the second sub-block SUB_BLK2 to the same value.

As used herein, the "data density" refers to the number of bits of information or data stored per memory cell. If N bits of data are stored per memory cell, the data density of the memory cell may be N (where N is a positive integer). For example, since a single level cell (SLC) stores 1 bit of data per memory cell, the data density of the SLC may be 1. For example, since a multi-level cell (MLC) stores 2 bits of data per memory cell, the data density of the MLC may be 2. For example, since a triple level cell (TLC) stores 3 bits of data per memory cell, the data density of the TLC may be 3. For example, since a quadruple level cell (QLC) stores 4 bits of data per memory cell, the data density of the QLC may be 4. For example, since a penta level cell (PLC) stores 5 bits of data per memory cell, the data density of the PLC may be 5. According to some embodiments, numbers (e.g., N) of bits of data stored in memory cells of the plurality of sub-blocks may be equal to each other.

In some embodiments, the FTL 112 may set the data density of memory cells with relatively low reliability to be small and set the data density of memory cells with relatively high reliability to be large. For example, in each of the first and second sub-blocks SUB_BLK1 and SUB_BLK2, the FTL 112 may set memory cells with low reliability, such as memory cells with relatively small channel holes, memory cells with relatively thin charge storage layers (for example, oxide-nitride-oxide (ONO) layers), and memory cells with irregular channel hole shapes, to the SLC or MLC. Also, the FTL 112 may set highly reliable memory cells to the TLC or QLC.

In some embodiments, the FTL 112 may manage a first mapping table (e.g., MT_SB1 in FIG. 16) corresponding to the first sub-block SUB_BLK1 and a second mapping table (e.g., MT_SB2 in FIG. 16) corresponding to the second sub-block SUB_BLK2 so that the logical sizes of the first and second sub-blocks SUB_BLK1 and SUB_BLK2 are equal to each other. Specifically, during an address mapping operation, the FTL 112 may map the same amount of logical data to the first and second sub-blocks SUB_BLK1 and SUB_BLK2. During a logical-to-physical (L2P) mapping operation in which a logical address received from the host 20, for example, a logical page number, is mapped to a physical address of the non-volatile memory 12, for example, a physical page number, the FTL 112 may perform an L2P mapping operation so that the number of logical page numbers allocated to the first mapping table is equal to the number of logical page numbers allocated to the second mapping table.

In an embodiment, the FTL 112 may perform the address mapping operation so that the number of logical addresses corresponding to the first sub-block SUB_BLK1 is equal to the number of logical addresses corresponding to the second sub-block SUB_BLK2. In an embodiment, the FTL 112 may perform the address mapping operation so that the number of logical addresses corresponding to the first sub-block SUB_BLK1 is different from the number of logical addresses corresponding to the second sub-block SUB_BLK2. In an embodiment, the number of physical addresses corresponding to the first sub-block SUB_BLK1 may be different from the number of physical addresses corresponding to the second sub-block SUB_BLK2. However, the embodiment is not limited thereto. In an embodiment, the number of physical addresses corresponding to the first sub-block SUB_BLK1 may be equal to the number of physical addresses corresponding to the second sub-block SUB_BLK2.

Figure 18:
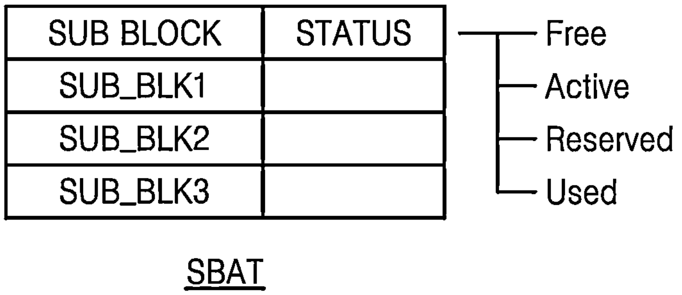
FIG. 18 is a diagram illustrating a sub-block allocation table according to an embodiment.

In an embodiment, the FTL 112 may manage a sub-block allocation table (e.g., FIG. 18). For example, the sub-block allocation table may represent the allocation status of the first sub-block SUB_BLK1 and the second sub-block SUB_BLK2.

In an embodiment, each of the first and second sub-blocks SUB_BLK1 and SUB_BLK2 may include a normal region (which may be referred to herein as a "first storage" region) and a reserved region (which may be referred to herein as a "second storage" region). The FTL 112 may manage a page table for each of the first and second sub-blocks SUB_BLK1 and SUB_BLK2. For example, the page table may include the number of free pages in the normal region (NFPC), the number of free pages in the reserved region (RFPC), and the number of valid pages in each sub-block, i.e., the valid page count (VPC). The FTL 112 may update the allocation statuses of the first and second sub-blocks SUB_BLK1 and SUB_BLK2 on the basis of NFPC, RFPC, and VPC. The allocation status update method may be described in detail with reference to FIGS. 19 and 20.

According to an embodiment, the FTL 112 may be provided as software, firmware, and/or hardware. In an embodiment, the FTL 112 may be provided as software, the storage controller 11 may further include a working memory into which the FTL 112 is loaded, and the processor 111 may control the address mapping operation for the non-volatile memory 12 by executing the FTL 112. For example, the working memory may be provided as volatile memory, such as static random access memory (SRAM) and dynamic random access memory (DRAM), or non-volatile memory, such as flash memory and phase-change random access memory (PRAM).

Also, data write and read operations of the non-volatile memory 12 may also be controlled by the processor 111 executing the FTL 112. Also, the FTL 112 may perform various functions, such as wear-leveling and garbage collection. The wear-leveling is related to a technology for preventing excessive deterioration of specific blocks by ensuring that blocks in the non-volatile memory 12 are used uniformly and may be performed by, for example, a firmware technology that balances erase counts of physical blocks. The garbage collection is related to a technology for securing usable capacities in the non-volatile memory 12 by selecting a victim sub-block among a plurality of sub-blocks of the non-volatile memory 12, copying valid data of the victim sub-block to a new sub-block, that is, a target sub-block, and erasing the victim sub-block.

The size of the first sub-block SUB_BLK1 may be different from the size of the second sub-block SUB_BLK2. Accordingly, the complexity may increase during a data copy operation between the first sub-block SUB_BLK1 and the second sub-block SUB_BLK2. For example, when the size of the first sub-block SUB_BLK1 is smaller than the size of the second sub-block SUB_BLK2, some pieces of the valid data stored in the second sub-block SUB_BLK2 may be copied to a sub-block other than the first sub-block SUB_BLK1. Accordingly, since the addresses of a plurality of sub-blocks have to be secured to access the copied data, the complexity of address mapping may increase.

As used herein, a page in which valid data is stored may be referred to as a valid page, a page in which invalid data is stored may be referred to as an invalid page, and a page in which no data is stored may be referred to as a free page. That is, the free page may include memory cells in an erase state.

The size of the first sub-block SUB_BLK1 may be smaller than the size of the second sub-block SUB_BLK2. Each of the first sub-block SUB_BLK1 and the second sub-block SUB_BLK2 may include a normal region and a reserved region. The normal region may include a region for storing data in preference (e.g., priority) to the reserved region. The reserved region may include a region in which data is programmed when (e.g., after/in response to determining that) the number of free pages of the normal region is 0 and at least some pieces (e.g., some bits) of data stored in the normal region are invalidated. The normal region may not comprise an erase state storage region, as the normal region may have no free pages. The normal region and the reserved region are described in detail below with reference to FIGS. 11 to 16.

The size of the normal region of the second sub-block SUB_BLK2 may be less than or equal to the size of the first sub-block SUB_BLK1. Also, the number of valid pages of the second sub-block SUB_BLK2 may be less than or equal to the size of the first sub-block SUB_BLK1. In other words, corresponding to the number of invalid pages created in the normal region of the second sub-block SUB_BLK2, data may be programmed in the reserved region of the second sub-block SUB_BLK2. Accordingly, the number of valid pages of the second sub-block SUB_BLK2 may be maintained at a value less than or equal to the size of the first sub-block SUB_BLK1.

In an embodiment, since the number of valid pages of the second sub-block SUB_BLK2 is maintained at a value less than or equal to the size of the first sub-block SUB_BLK1, all valid data of the second sub-block SUB_BLK2 may be copied to the first sub-block SUB_BLK1. Since only address mapping for a single sub-block is required to access the copied data, the complexity of address mapping may be lowered.

The processor 111 may include a central processing unit (CPU) or microprocessor and may control all operations of the storage controller 11. In an embodiment, the processor 111 may be provided as a multi-core processor, for example, as a dual-core processor or a quad-core processor. Also, the buffer memory 114 may temporarily store data to be written to the non-volatile memory 12 or data to be read from the non-volatile memory 12. The buffer memory 114 may be provided inside the storage controller 11 but may also be placed outside the storage controller 11. For example, the storage controller 11 may further include a buffer memory manager or a buffer memory interface to communicate with the buffer memory 114.

The host interface 113 may transmit a packet to and receive a packet from the host 20. The packet transmitted from the host 20 to the host interface 113 may include a command or data to be written to the non-volatile memory 12, and the packet transmitted from the host interface 113 to the host 20 may include a response to the command or data read from the non-volatile memory 12. The non-volatile memory interface 115 may transmit data to be written to the non-volatile memory 12 to the non-volatile memory 12 or receive data read from the non-volatile memory 12. This non-volatile memory interface 115 may be configured to comply with standard regulations, such as Toggle or open NAND flash interface (ONFI).

The storage device 10 may include storage media for storing data in response to a request from the host 20. For example, the storage device 10 may include at least one of a solid state drive (SSD), an embedded memory, and a removable external memory. When the storage device 10 includes an SSD, the storage device 10 may include a device that complies with the non-volatile memory express (NVMe) standard. When the storage device 10 includes an embedded memory or an external memory, the storage device 10 may include a device that complies with the universal flash storage (UFS) or embedded multi-media card (eMMC) standard. The host 20 and the storage device 10 may each generate and transmit a packet according to the adopted standard protocol.

In an embodiment, the host 20 may include a host controller 21 and a host memory 22. The host controller 21 may manage operations of storing data of a buffer region of the host memory 22 in the non-volatile memory 12 or storing data of the non-volatile memory 12 in the buffer region. The host memory 22 may function as a buffer memory for temporarily storing data to be transmitted to the storage device 10 or data transmitted from the storage device 10. For example, the host controller 21 may include one of a plurality of modules in an application processor, and the application processor may be provided as a system on chip (SoC). Also, the host memory 22 may include embedded memory provided inside the application processor or include non-volatile memory or a memory module arranged outside of the application processor.

Figure 2:
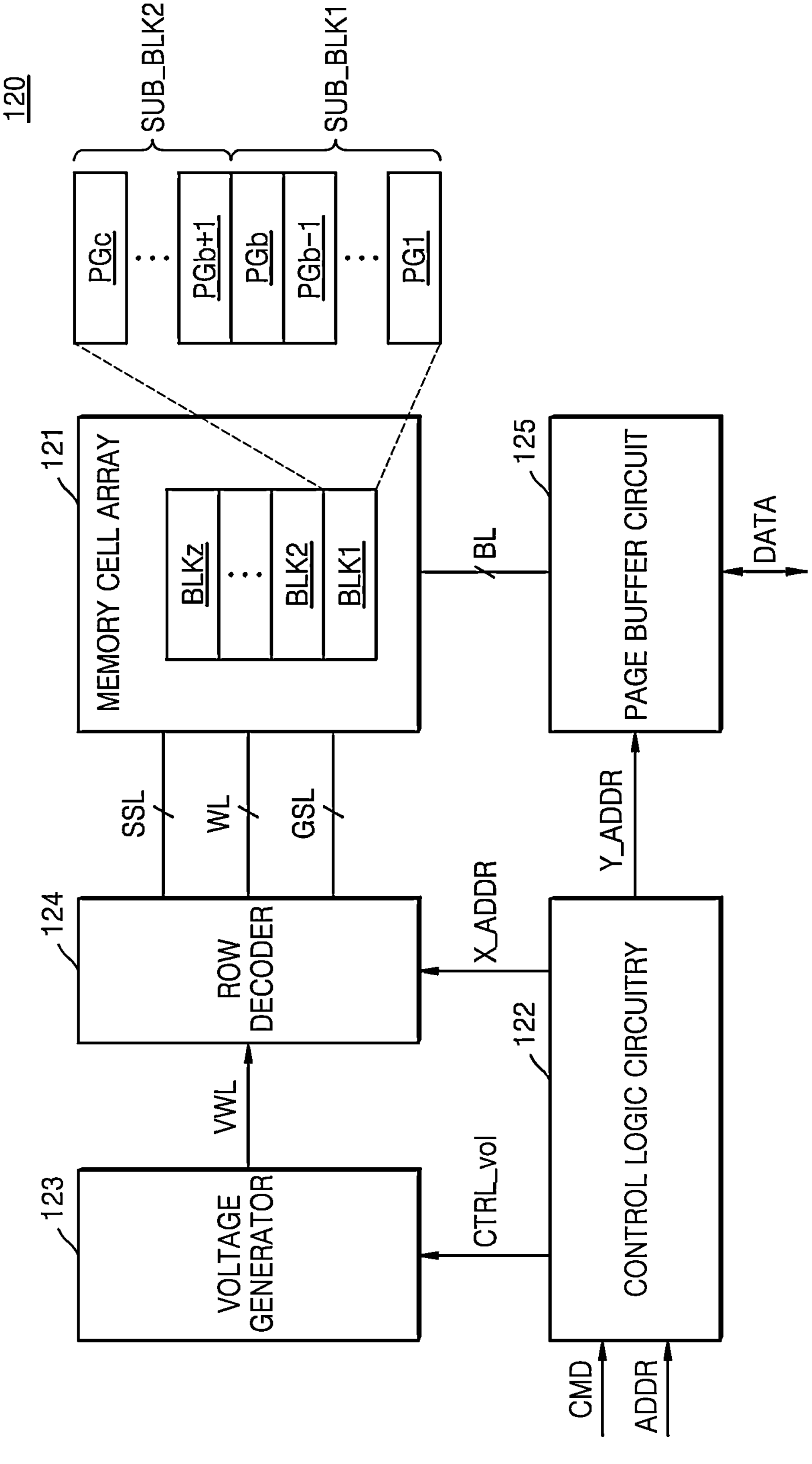
FIG. 2 is a block diagram showing non-volatile memory according to an embodiment.

FIG. 2 is a block diagram showing non-volatile memory 120 according to an embodiment. Referring to FIG. 2, the non-volatile memory 120 may include a memory cell array 121, control logic circuitry 122, a voltage generator 123, a row decoder 124, and a page buffer circuit 125. The non-volatile memory 120 may correspond to (e.g., may be) an example of the non-volatile memory 12 of FIG. 1.

The memory cell array 121 may include a plurality of memory blocks BLK1 to BLKz, each of the plurality of memory blocks BLK1 to BLKz may include a plurality of pages PG1 to PGc, and z and c may be positive integers, which may vary according to embodiments. For example, some pages PG1 to PGb among the plurality of pages PG1 to PGc may be in the first sub-block SUB_BLK1, the other pages PGb+1 to PBc among the plurality of pages PG1 to PGc may be in the second sub-block SUB_BLK2, and b may be a positive integer less than c. For example, a memory block or sub-block may be a unit of erase, and a page may be a unit of program and read. The memory cell array 121 may be connected to the page buffer circuit 125 via bit lines BL and may be connected to the row decoder 124 via word lines WL, string selection lines SSL, and ground selection lines GSL.

In an embodiment, the memory cell array 121 may include a 3-dimensional memory cell array, and the 3-dimensional memory cell array may include a plurality of NAND strings. Each of the NAND strings may include memory cells respectively connected to word lines vertically stacked on a substrate. The disclosures of U.S. Pat. Nos. 7,679,133, 8,553,466, 8,654,587, and 8,559,235 and US Application Publication No. 2011/0233648 are incorporated by reference herein in their entireties.

In an embodiment, the memory cell array 121 may include flash memory, and the flash memory may include a 2D NAND memory array or a 3D (vertical) NAND (VNAND) memory array. In an example, the storage device 10 may include various other types of non-volatile memories. For example, the memory cell array 121 may include magnetic random access memory (MRAM), spin-transfer torque MRAM, conductive bridging RAM (CBRAM), ferroelectric RAM (FeRAM), phase-change RAM (PRAM), resistive RAM, and various other types of memories.

The control logic circuitry 122 may control all various operations inside the non-volatile memory 120. The control logic circuitry 122 may output various control signals in response to a command CMD and/or an address ADDR. For example, the control logic circuitry 122 may output a voltage control signal CTRL_vol, a row address X_ADDR, and a column address Y_ADDR. The voltage generator 123 may generate various types of voltages to perform program, read, and erase operations on the basis of the voltage control signal CTRL_vol. For example, the voltage generator 123 may generate a program voltage, a read voltage, a program verification voltage, an erase voltage, or the like as a word line voltage VWL.

The row decoder 124 may select one of the plurality of word lines WL in response to the row address X_ADDR and may select one of the plurality of string selection lines SSL. For example, the row decoder 124 may apply a program voltage and a program verification voltage to the selected word line during a program operation and may apply a read voltage to the selected word line during a read operation. The page buffer circuit 125 may select at least one bit line among the bit lines BL in response to the column address Y_ADDR. The page buffer circuit 125 may operate as a write driver or a sensing amplifier depending on an operation mode.

Figure 3:
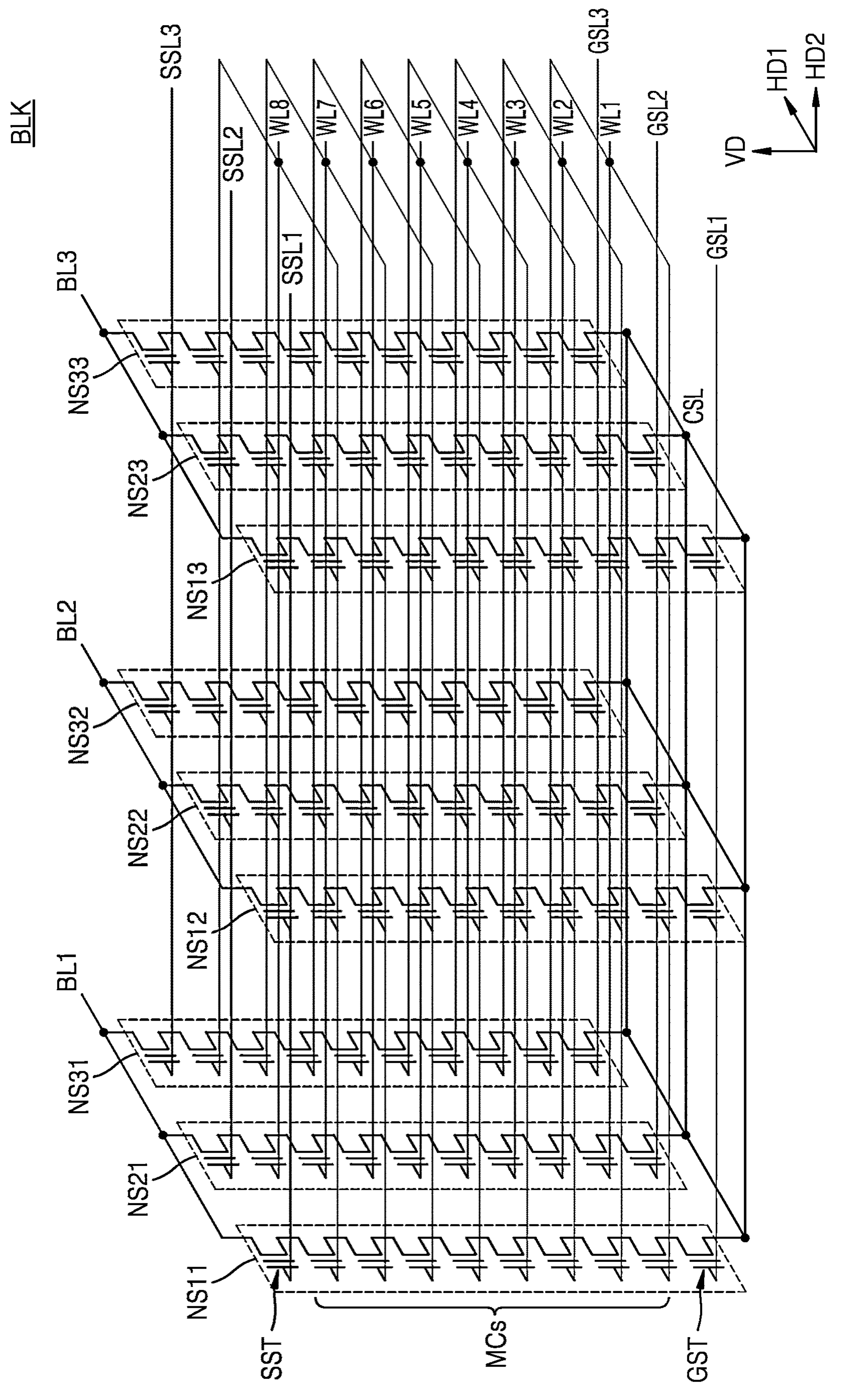
FIG. 3 is a circuit diagram showing a memory block according to an embodiment.

FIG. 3 is a circuit diagram showing a memory block BLK according to an embodiment.

Referring to FIG. 3, the memory block BLK may correspond to one of the plurality of memory blocks BLK1 to BLKz of FIG. 2. The memory block BLK may include NAND strings NS11 to NS33, and each NAND string (e.g., NS11) may include a string selection transistor SST, a plurality of memory cells MCs, and a ground selection transistor GST, which are connected in series. The transistors SST and GST and the memory cells MCs of each NAND string may form a structure stacked on a substrate in the vertical direction VD.

Bit lines BL1 to BL3 may extend in a first direction HD1, and word lines WL1 to WL8 may extend in a second direction HD2. The NAND strings NS11, NS21, and NS31 may be arranged between the first bit line BL1 and the common source line CSL, the NAND strings NS12, NS22, and NS32 may be arranged between the second bit line BL2 and the common source line CSL, and the NAND strings NS13, NS23, and NS33 may be arranged between the third bit line BL3 and the common source line CSL.

The string selection transistors SST may be connected to corresponding (e.g., respective) string selection lines SSL1 to SSL3. The memory cells MCs may be respectively connected to corresponding word lines WL1 to WL8. The ground selection transistor GST may be connected to the corresponding ground selection lines GSL1 to GSL3. The string selection transistor SST may be connected to the corresponding bit line, and the ground selection transistor GST may be connected to the common source line CSL. Here, the number of NAND strings, the number of word lines, the number of bit lines, the number of ground selection lines, and the number of string selection lines may vary according to embodiments.

Figure 4A:
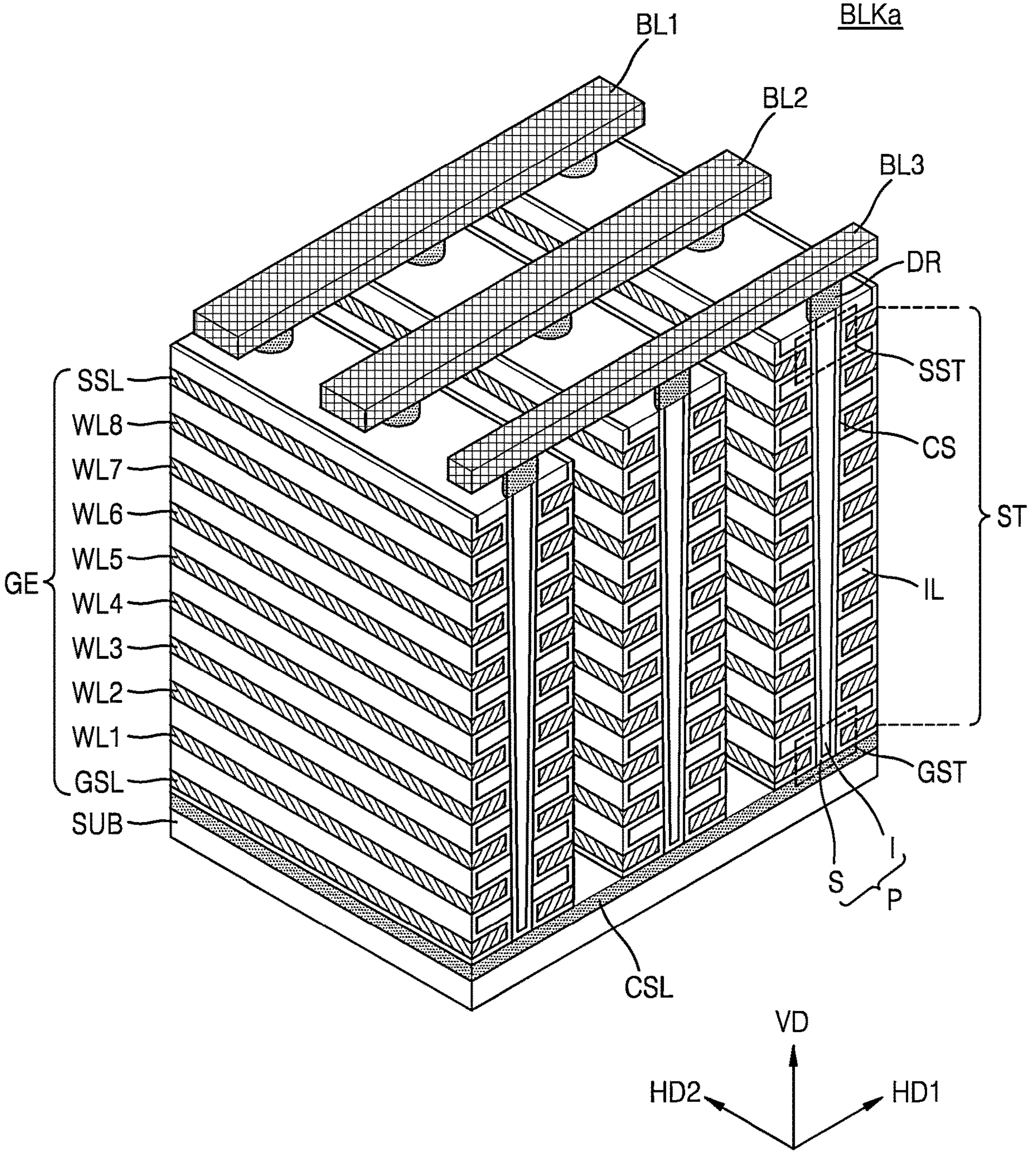
FIG. 4A is a perspective view showing a memory block according to an embodiment.

FIG. 4A is a perspective view showing a memory block BLKa according to an embodiment.

Referring to FIG. 4A, the memory block BLKa may correspond to one of the plurality of memory blocks BLK1 to BLKz of FIG. 2. The memory block BLKa may include a memory stack ST extending in a vertical direction VD on a substrate SUB. For example, the memory block BLKa may include a single memory stack ST between the substrate SUB and bit lines BL1 to BL3. Common source lines CSL may be arranged on the substrate SUB, a plurality of insulating films IL extending in a second horizontal direction HD2 may be sequentially provided in the vertical direction VD above a region of the substrate SUB between two adjacent common source lines CSL, and the insulating films IL may be spaced apart from each other by a specific (e.g., constant) distance in the vertical direction VD. Pillars P passing through the insulating films IL in the vertical direction VD may be provided above a region of the substrate SUB between two adjacent common source lines CSL. A surface layer S of each of the pillars P may include a first-type silicon material and may function as a channel region. Also, an inner layer I of each of the pillars P may include an insulating material, such as silicon oxide, and an air gap.

In the region between two adjacent common source lines CSL, a charge storage layer CS is provided along the exposed surfaces of the insulating films IL, the pillars P, and the substrate SUB. The charge storage layer CS may include a gate insulating layer, a charge trap layer, and a blocking insulating layer. For example, the charge storage layer CS may have an ONO structure. Also, a gate electrode GE, such as selection lines GSL and SSL and word lines WL1 to WL8, are provided on the exposed surface of the charge storage layer CS in the region between two adjacent common source lines CSL. Drains DR are respectively provided on the plurality of pillars P. The bit lines BL1 to BL3 extend in a first horizontal direction HD1 on the drains DR and are spaced apart from each other by a specific distance in the second horizontal direction HD2.

Figure 4B:
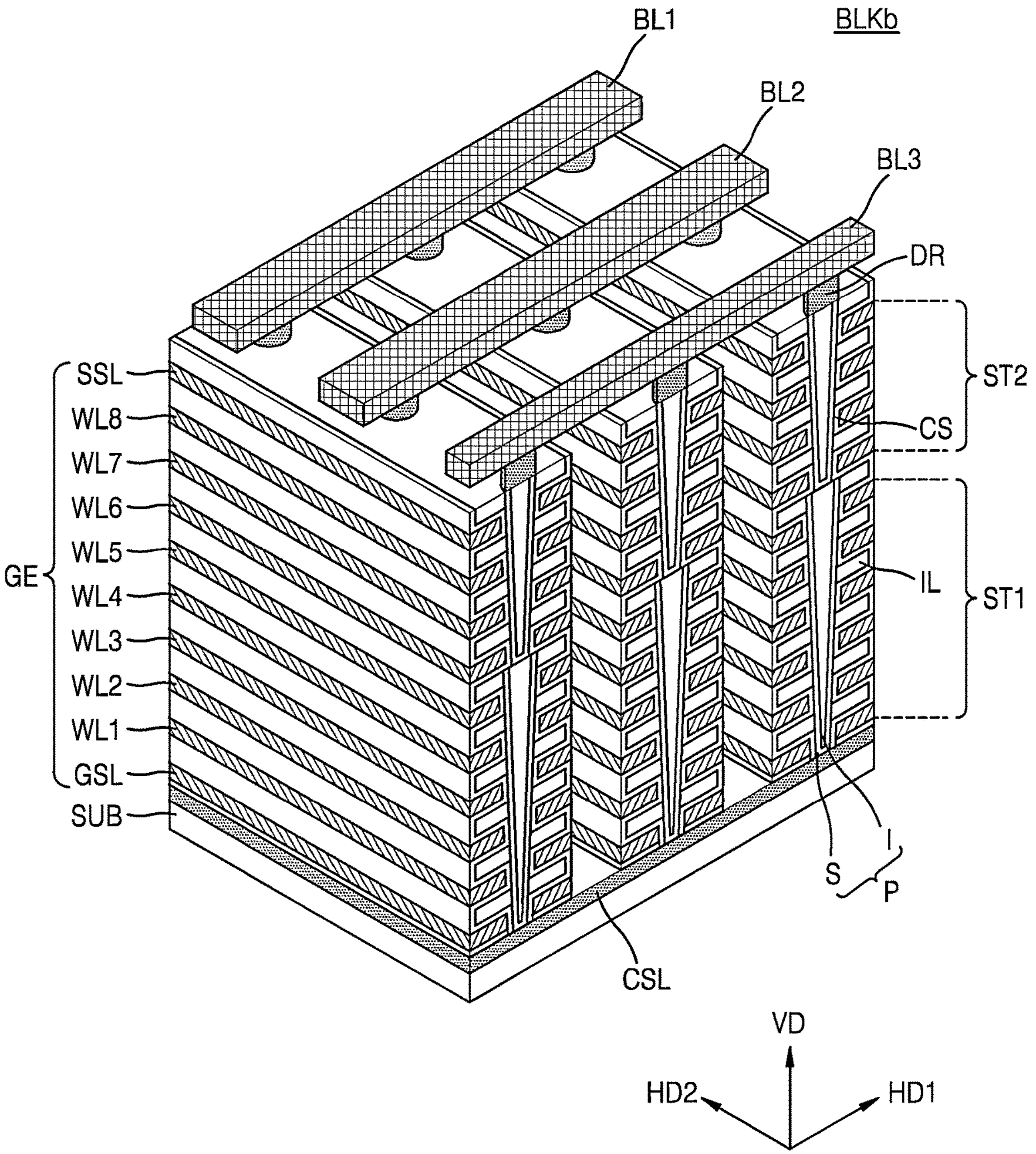
FIG. 4B is a perspective view showing a memory block according to an embodiment.

FIG. 4B is a perspective view showing a memory block BLKb according to an embodiment.

Referring to FIG. 4B, the memory block BLKb may correspond to one of the plurality of memory blocks BLK1 to BLKz of FIG. 2. Also, the memory block BLKb may correspond to a modified example of the memory block BLKa in FIG. 4A, and the descriptions given above with reference to FIG. 4A may also be applied to this embodiment. The memory block BLKb may include a first memory stack ST1 and a second memory stack ST2 stacked in a vertical direction VD on a substrate SUB. For example, the memory block BLKb may include two memory stacks, that is, the first and second memory stacks ST1 and ST2, between the substrate SUB and bit lines BL1 to BL3. Accordingly, the memory block BLKb may have a multi-stack structure, for example, a 2-stack structure. Also, the vertical lengths of the first and second memory stacks ST1 and ST2 may be different from each other. However, the embodiment is not limited thereto, and the memory block may include three or more memory stacks between the substrate SUB and the bit lines BL1 to BL3 according to embodiments.

Figure 5:
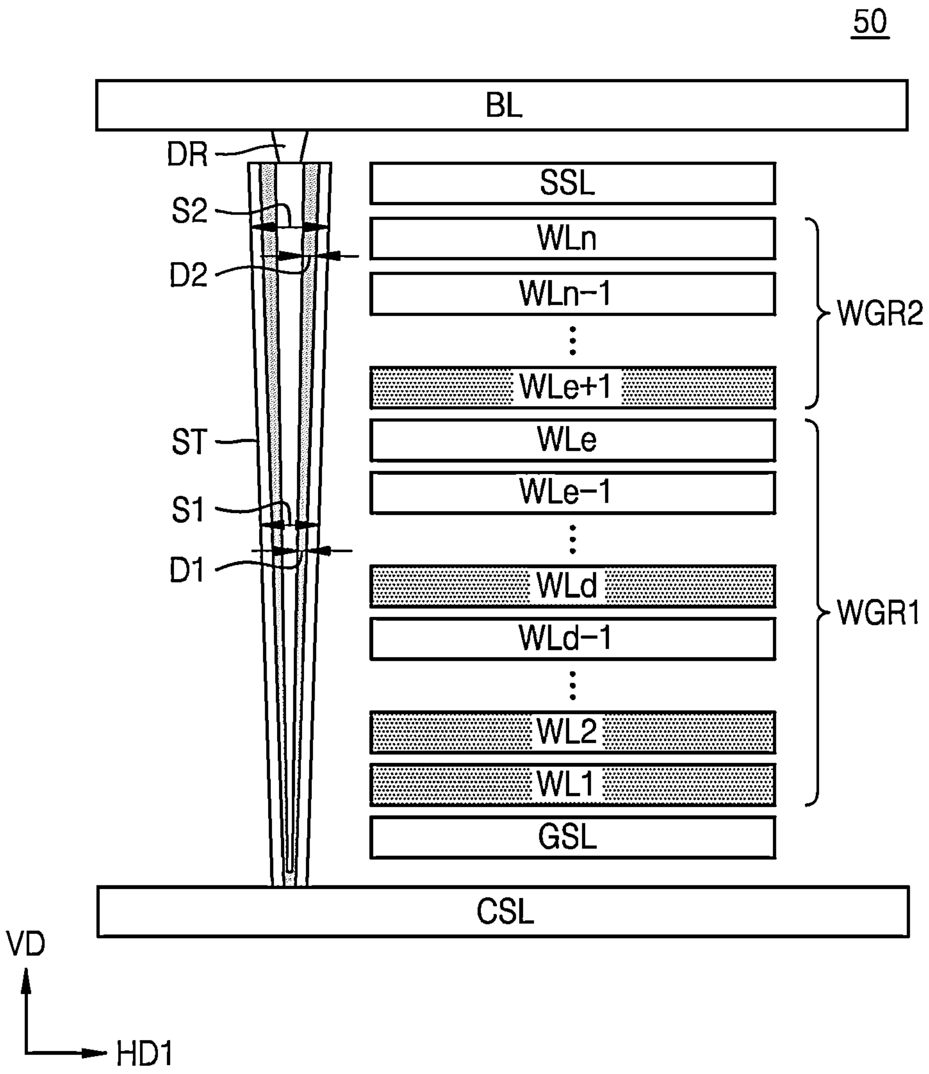
FIG. 5 schematically shows non-volatile memory according to an embodiment.

FIG. 5 schematically shows non-volatile memory 50 according to an embodiment.

Referring to FIG. 5, the non-volatile memory 50 may include a common source line CSL and a bit line BL extending in a first horizontal direction HD1 and further include a memory stack ST extending in a vertical direction VD. Also, the memory stack ST may be connected to the bit line BL via a drain DR. For example, the non-volatile memory 50 may correspond to (e.g., may be) an example of FIG. 4A, and the memory stack ST may correspond to (e.g., may include) the pillar P of FIG. 4A and the NAND string NS11 of FIG. 3.

The non-volatile memory 50 may further include a plurality of word lines WL1 to WLn stacked in the vertical direction VD, at least one ground selection line GSL may be located between the common source line CSL and the word line WL1, and at least one string selection line SSL may be located between the bit line BL and the word line WLn. Although not shown, an erase control line (e.g., GIDL_SS) may be further provided between the string selection line SSL and the bit line BL, and an erase control line (e.g., GIDL_GS) may be further provided between the ground selection line GSL and the common source line CSL.

In an embodiment, the plurality of word lines WL1 to WLn may be grouped into a plurality of groups including a first word line group WGR1 and a second word line group WGR2. The first word line group WGR1 may include word lines WL1 to WLe relatively close to a substrate and the second word line group WGR2 may include word lines WLe+1 to WLn relatively far from the substrate. Also, e is a positive integer between 1 and n, and d is a positive integer less than e. According to embodiments, the plurality of word lines WL1 to WLn may be grouped into three or more groups. In an embodiment, the number of word lines of the first word line group WGR1 may be different from the number of word lines of the second word line group WGR2. For example, the number of word lines of the first word line group WGR1 may be greater than the number of word lines of the second word line group WGR2. In other words, e may be greater than n/2.

Referring to FIGS. 1 and 5 together, the word lines WL1 to WLe of the first word line group WGR1 may be connected to the first sub-block SUB_BLK1, and the word lines WLe+1 to WLn of the second word line group WGR2 may be connected to the second sub-block SUB_BLK2. Also, the block size of the first sub-block SUB_BLK1 may correspond to the number of word lines WL1 to WLe of the first word line group WGR1, and the block size of the second sub-block SUB_BLK2 may correspond to the number of word lines WLe+1 to WLn of the second word line group WGR2. Accordingly, the first and second sub-blocks SUB_BLK1 and SUB_BLK2 may have different block sizes.

In some embodiments, the storage controller 11 may set the data densities of memory cells of the first sub-block SUB_BLK1 to the same value. For example, the memory cells connected to the word lines WL1 to WLe of the first word line group WGR1 may have the data density of one of SLC, MLC, TLC, QLC, and PLC. However, the embodiment is not limited thereto, and the memory cells connected to some of the word lines WL1 to WLe of the first word line group WGR1 may have different data densities. For example, the storage controller 11 may set the data density of memory cells with relatively low reliability to be lower than the data density of memory cells with relatively high reliability.

The storage controller 11 may set the data densities of memory cells of the second sub-block SUB_BLK2 to the same value. The memory cells connected to the word lines WLe+1 to WLn of the second word line group WGR2 may have the data density of one of SLC, MLC, TLC, QLC, and PLC.

However, the embodiment is not limited thereto, and the memory cells connected to some of the word lines WLe+1 to WLn of the second word line group WGR2 may have different data densities. For example, the storage controller 11 may set the data density of memory cells with relatively low reliability to be lower than the data density of memory cells with relatively high reliability.

As process technology develops, the number of word lines WL1 to WLn may increase. Accordingly, the size and shape of a channel hole in the memory stack ST may not be uniform in a vertical direction VD, and the thickness of a charge storage layer CL in the memory stack ST, that is, the thickness of an ONO layer, may also not be uniform in the vertical direction VD. For example, the size S1 of the channel hole connected to the word line WL1 (or referred to as the "lower" word line WL1) at a lower level may be less than the size S2 of the channel hole connected to the word line WLn (or referred to as the "upper" word line WLn) at an upper level. For example, the thickness D1 of the ONO layer connected to the lower word line WL1 may be less than the thickness D2 of the ONO layer connected to the upper word line WLn.

Accordingly, lower memory cells corresponding to lower channel holes may have relatively low reliability. Also, the voltage applied to the ground selection line GSL or the common source line CSL adjacent to lower memory cells may be different from the voltage applied to the lower word lines WL1 and WL2 respectively connected to the lower memory cells. Accordingly, the lower memory cells may have lower reliability than the upper memory cells.

In addition, striation, dimple, chipping, or the like may occur in the channel hole corresponding to a middle memory cell connected to the word line WLd at a middle level in the first word line group WGR1. Therefore, the middle memory cells may have relatively low reliability. Although not shown, the second word line group WGR2 may also include a middle memory cell.

According to the embodiment, each of memory cells with relatively low reliability may be programmed later than memory cells with relatively high reliability. That is, the reliability of the memory stack ST may be improved by programming memory cells with relatively low retention performance relatively late. In the embodiment, the memory cells with relatively low reliability may be provided in the reserved region and the memory cells with relatively high reliability may be provided in the normal region.

Figure 6:
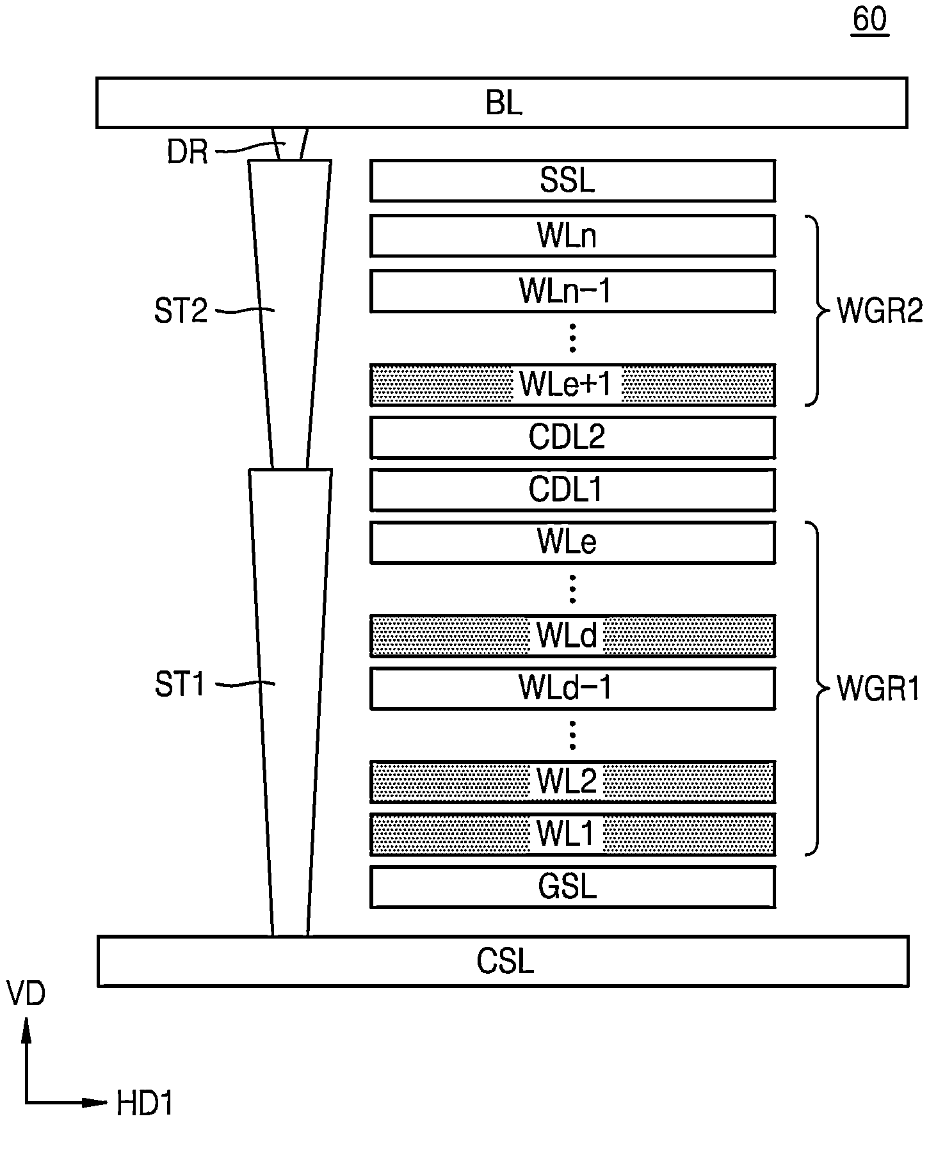
FIG. 6 schematically shows non-volatile memory according to an embodiment.

FIG. 6 schematically shows non-volatile memory 60 according to an embodiment.

Referring to FIG. 6, the non-volatile memory 60 may include a common source line CSL and a bit line BL extending in a first horizontal direction HD1 and further include a first memory stack ST1 and a second memory stack ST2 extending in a vertical direction VD. Also, the first memory stack ST1 may be disposed on the common source line CSL, and the second memory stack ST2 may be disposed on the first memory stack ST1 and connected to the bit line BL via a drain DR. For example, the non-volatile memory 60 may correspond to (e.g., may be) an example of FIG. 4B, and the first memory stack ST1 and the second memory stack ST2 may correspond to (e.g., may be) the first memory stack ST1 and the second memory stack ST2 of FIG. 4B, respectively.

In addition, the non-volatile memory 60 corresponds to a modified example of the non-volatile memory 50 of FIG. 5, and repeated descriptions thereof are omitted. The non-volatile memory 60 may further include first and second junction dummy word lines CDL1 and CDL2 corresponding to the junction between the first memory stack ST1 and the second memory stack ST2. However, the embodiment is not limited thereto, and the number of junction dummy word lines corresponding to the junction may vary according to embodiments. Also, according to an embodiment, the junction dummy word line may not be provided.

In order to further increase the number of word lines WL1 to WLn stacked on a substrate, a plurality of channel holes may be sequentially formed above the substrate. For example, a first channel hole formed above the substrate may correspond to the first memory stack ST1 and a second channel hole formed above the first channel hole may correspond to the second memory stack ST2. Accordingly, the sizes and shapes of the channel holes in the first and second memory stacks ST1 and ST2 may not be uniform in the vertical direction VD, and the thicknesses of the charge storage layers in the first and second memory stacks ST1 and ST2, that is, the thicknesses of the ONO layers, may also not be uniform in the vertical direction VD.

In an embodiment, the first memory stack ST1 may be connected to a first word line group WGR1 and the second memory stack ST2 may be connected to a second word line group WGR2. The first word line group WGR1 may include a first number of word lines WL1 to WLe, and the second word line group WGR2 may include a second number of word lines WLe+1 to WLn which is different from the first number. For example, the first number may be greater than the second number. In some embodiments, word lines connected to the first memory stack ST1 may be grouped into a plurality of groups, and word lines connected to the second memory stack ST2 may also be grouped into a plurality of groups. Also, the erase operation may be performed independently for each group.

Referring to FIGS. 1 and 6 together, the word lines WL1 to WLe of the first word line group WGR1 may be connected to the first sub-block SUB_BLK1, and the word lines WLe+1 to WLn of the second word line group WGR2 may be connected to the second sub-block SUB_BLK2.

In each of the first and second memory stacks ST1 and ST2, the diameter of the lower channel hole (e.g., of a reserved region) may be smaller than the diameter of the upper channel hole (e.g., of a normal region). Also, the thickness of the charge storage layer corresponding to the lower channel hole may be less than the thickness of the charge storage layer corresponding to the upper channel hole. Accordingly, the lower memory cells corresponding to the lower channel holes may have lower reliability than the upper memory cells corresponding to the upper channel holes.

Also, in at least one of the first and second memory stacks ST1 and ST2, a striation layer, a chipping layer, a dimple layer, or the like may occur in a portion of the middle channel hole. Accordingly, at least one of the channel hole size, channel hole shape, and charge storage layer thickness of the middle memory cell corresponding to the middle channel hole may be different from those of other memory cells. Accordingly, the middle memory cell corresponding to the middle channel hole may have lower reliability than other memory cells.

Also, in each of the first and second memory stacks ST1 and ST2, at least one memory cell adjacent to the boundary between the first and second memory stacks ST1 and ST2 may have relatively low reliability.

According to the embodiment, each of memory cells with relatively low reliability may be programmed later than memory cells with relatively high reliability. That is, the reliability of the first and second memory stacks ST1 and ST2 may be improved by programming memory cells with relatively low retention performance relatively late. According to an embodiment, in each of the first and second memory stacks ST1 and ST2, the memory cells with relatively low reliability may be provided in the reserved region and the memory cells with relatively high reliability may be provided in the normal region.

In some embodiments, a height of memory cells in the normal region is greater than a height of memory cells in the reserved region. For example, the normal region includes a first memory cell and the reserved region includes a second memory cell. A height of the first memory cell is greater than a height of the second memory cell. As an example, the normal region may be farther than the reserved region from the substrate SUB (FIG. 4A). Accordingly, the reserved region may be between (in the vertical direction VD) the normal region and the substrate SUB. The term "height," as used herein, may thus refer to a distance from (e.g., an upper surface of) the substrate SUB.

Figure 7:
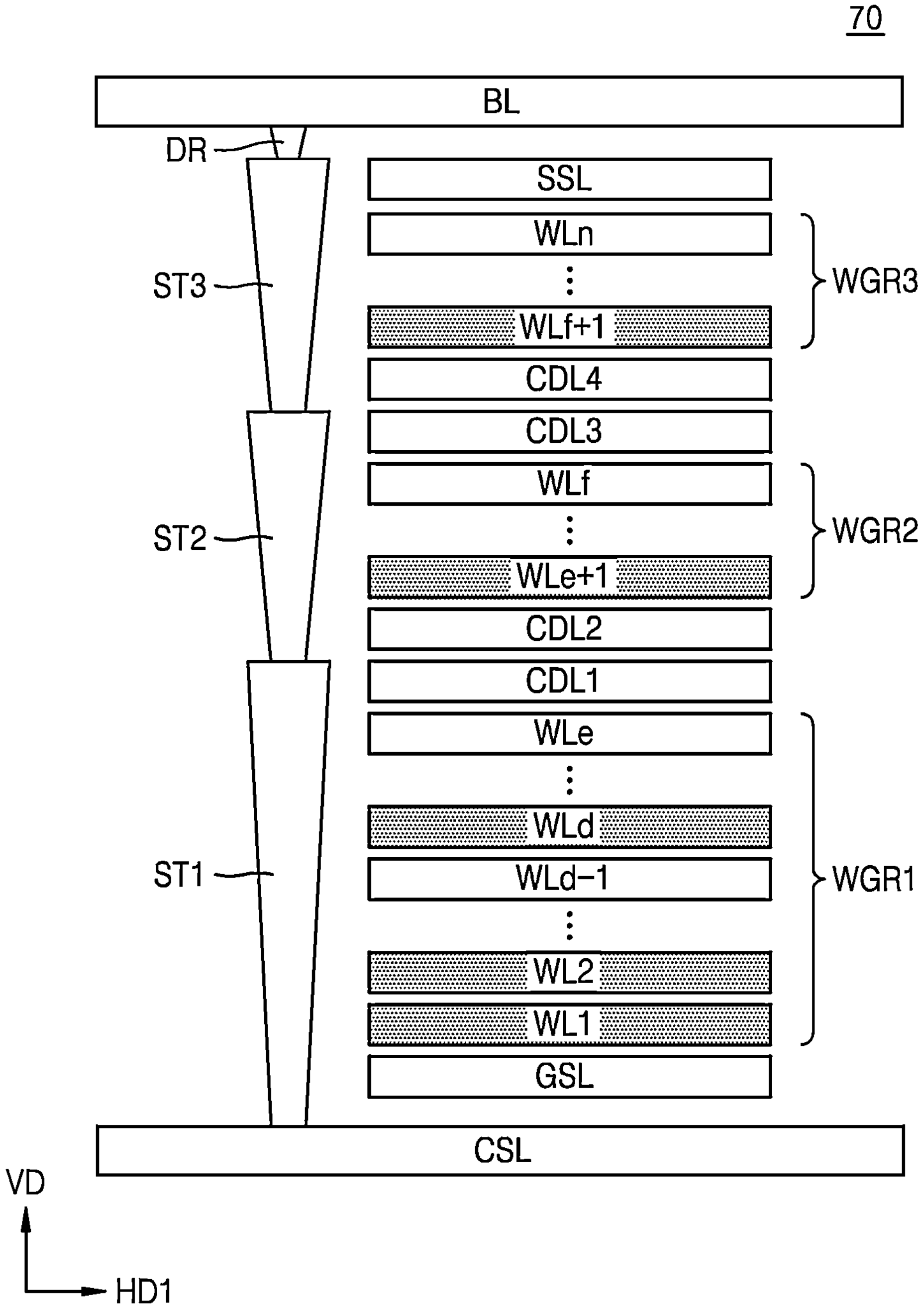
FIG. 7 schematically shows non-volatile memory according to an embodiment.

FIG. 7 schematically shows non-volatile memory 70 according to an embodiment. The non-volatile memory 70 corresponds to a modified example of the non-volatile memory 60 of FIG. 6, and repeated descriptions thereof are omitted.

Referring to FIG. 7, the non-volatile memory 70 may include first to third memory stacks ST1, ST2, and ST3 extending in a vertical direction VD. Also, the first memory stack ST1 may be disposed on the common source line CSL, the second memory stack ST2 may be disposed on the first memory stack ST1, and the third memory stack ST3 may be disposed on the second memory stack ST2 and connected to a bit line BL via a drain DR. The non-volatile memory 70 may further include first and second junction dummy word lines CDL1 and CDL2 corresponding to (e.g., at) the junction between the first and second memory stacks ST1 and ST2 and third and fourth junction dummy word lines CDL3 and CDL4 corresponding to the junction between the second and third memory stacks ST2 and ST3.

In an embodiment, the first memory stack ST1 may be connected to a first word line group WGR1, the second memory stack ST2 may be connected to a second word line group WGR2, and the third memory stack ST3 may be connected to a third word line group WGR3. The first word line group WGR1 may include a first number of word lines WL1 to WLe, the second word line group WGR2 may include a second number of word lines WLe+1 to WLf different from the first number, and the third word line group WGR3 may include a third number of word lines WLf+1 to WLn different from the first number. Also, f is a positive integer between e and n. For example, the first number may be greater than the second number and the third number. For example, the second number may be greater than the third number. In some embodiments, word lines connected to at least one of the first to third memory stacks ST1, ST2, and ST3 may be grouped into a plurality of groups, and the erase operation may be performed independently for each group.

Referring to FIGS. 1 and 7 together, each block BLK may further include a third sub-block. Also, the word lines WL1 to WLe of the first word line group WGR1 may be connected to the first sub-block SUB_BLK1, the word lines WLe+1 to WLf of the second word line group WGR2 may be connected to the second sub-block SUB_BLK2, and the word lines WLf+1 to WLn of the third word line group WGR3 may be connected to the third sub-block.

In each of the first to third memory stacks ST1, ST2, and ST3, the diameter of the lower channel hole may be smaller than the diameter of the upper channel hole. Also, the thickness of the charge storage layer corresponding to the lower channel hole may be less than the thickness of the charge storage layer corresponding to the upper channel hole. Accordingly, the lower memory cells corresponding to the lower channel holes may have lower reliability than the upper memory cells corresponding to the upper channel holes.

At least one memory cell adjacent to the boundary between the first and second memory stacks ST1 and ST2 and/or at least one memory cell adjacent to the boundary between the second and third memory stacks ST2 and ST3, and at least one memory cell adjacent to the bit line BL in the third memory stack ST3 may have relatively low reliability. For example, the memory cells connected (e.g., electrically connected) to first, second, third, and fourth junction dummy word lines CDL1 to CDL4 may have relatively low reliability.

According to the embodiment, each of memory cells with relatively low reliability may be programmed later than memory cells with relatively high reliability. That is, the reliability of the first to third memory stacks ST1 to ST3 may be improved by programming memory cells with relatively low retention performance relatively late. According to an embodiment, in each of the first to third memory stacks ST1 to ST3, the memory cells with relatively low reliability may be provided in the reserved region and the memory cells with relatively high reliability may be provided in the normal region.

Figure 8:
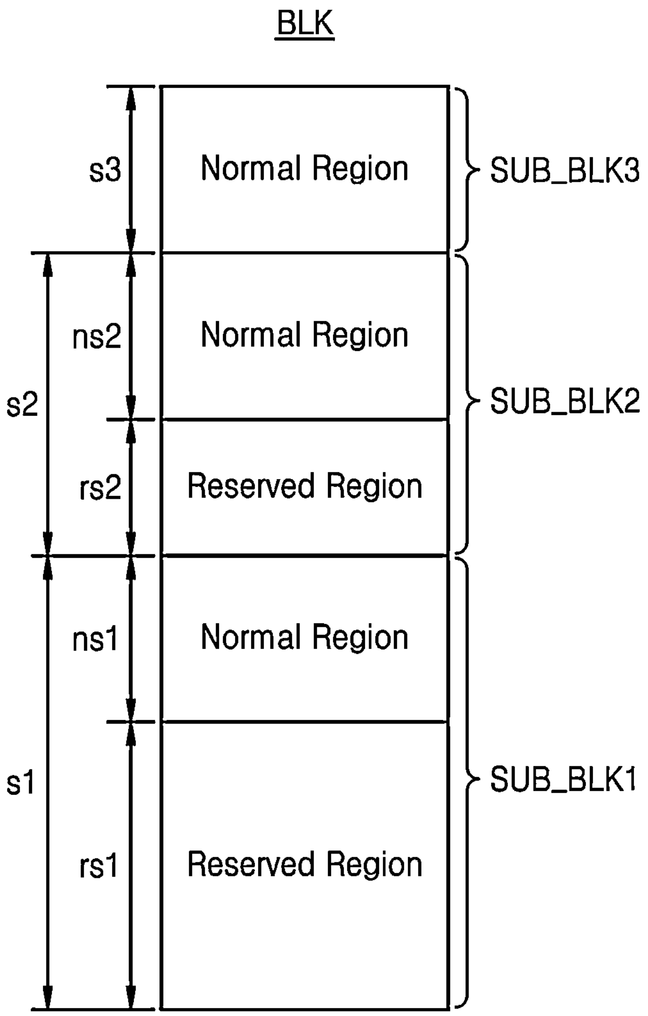
FIG. 8 is a diagram illustrating a memory block according to an embodiment.

FIG. 8 is a diagram illustrating a memory block BLK according to an embodiment.

Referring to FIG. 8, the memory block BLK may include first to third sub-blocks SUB_BLK1 to SUB_BLK3.

Each of the first to third sub-blocks SUB_BLK1 to SUB_BLK3 may include a normal region and each of the first and second sub-blocks SUB_BLK1 and SUB_BLK2 may also include a reserved region.

The size of the first sub-block SUB_BLK1 may be s1, the size of the second sub-block SUB_BLK2 may be s2, and the size of the third sub-block SUB_BLK3 may be s3. s1 may be greater than s2, and s2 may be greater than s3.

In the first sub-block SUB_BLK1, the size of the normal region may be ns1 and the size of the reserved region may be rs1. In the second sub-block SUB_BLK2, the size of the normal region may be ns2 and the size of the reserved region may be rs2. In the third sub-block SUB_BLK3, the size of the normal region may be s3. ns1 may be less than or equal to s3, and ns2 may be less than or equal to s3.

As used herein, the size of a sub-block, normal region, or reserved region is mainly described using the number of pages, but the embodiment is not limited thereto. For example, the size of the sub-block, normal region, or reserved region may correspond to the number of word lines connected to the sub-block, normal region, or reserved region. For example, the size of the sub-block, normal region, or reserved region may correspond to the length of the sub-block, normal region, or reserved region in a vertical direction (e.g., VD in FIG. 4A). For example, the size of the sub-block, normal region, or reserved region may correspond to the size of data stored in the sub-block, normal region, or reserved region. For example, the size of the sub-block, normal region, or reserved region may correspond to the number of pages in the sub-block, normal region, or reserved region.

In each of the first and second sub-blocks SUB_BLK1 and SUB_BLK2, the normal region may include a region in which data is stored in preference to (e.g., before storing data in) the reserved region. The reserved region may include a region in which data is programmed if the number of free pages of the normal region is 0 and at least some pieces of data stored in the normal region are invalidated.

For example, in the second sub-block SUB_BLK2, data may be preferentially programmed in the normal region. Also, if the number of free pages of the normal region is 0 and some pieces of data stored in the normal region is invalidated, data may be programmed in the reserved region.

The valid page count of each of the first and second sub-blocks SUB_BLK1 and SUB_BLK2 may be maintained at a value less than or equal to the total page count of the third sub-block SUB_BLK3.

The valid page count of the first sub-block SUB_BLK1 may represent the number of valid pages in the first sub-block SUB_BLK1 and the valid page count of the second sub-block SUB_BLK2 may represent the number of valid pages in the second sub-block SUB_BLK2.

The total page count of the third sub-block SUB_BLK3 may represent the number of total pages in the third sub-block SUB_BLK3. The total page count may represent the sum of valid page count, free page count, and invalid page count. The free page count may represent the number of free pages, and the invalid page count may represent the number of invalid pages.

That is, the size s3 of the third sub-block SUB_BLK3 may correspond to the total page count of the third sub-block SUB_BLK3.

The size (e.g., number) of valid pages stored in each of the first and second sub-blocks SUB_BLK1 and SUB_BLK2 may be managed to be s3 or less. For example, the valid data corresponding to the size of invalid pages in the normal region of the second sub-block SUB_BLK2 may be stored in the reserved region. Accordingly, the size of the total valid data stored in the second sub-block SUB_BLK2 may be maintained at a value of ns2 or less, that is, s3 or less. s3 is thus the smallest size among the sizes of the sub-blocks.

According to an embodiment, since the size of valid data stored in each sub-block is managed to be less than or equal to the size of another sub-block, the data copying between sub-blocks may be performed efficiently.

Figure 9:
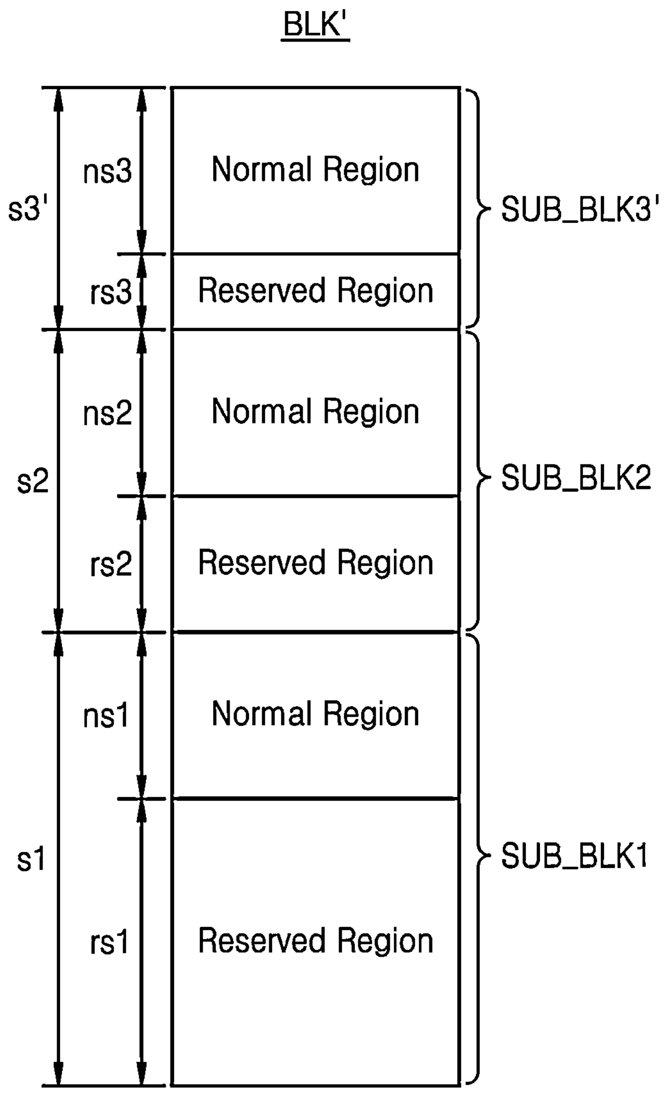
FIG. 9 is a diagram illustrating a memory block according to an embodiment.

FIG. 9 is a diagram illustrating a memory block BLK' according to an embodiment.

Referring to FIG. 9, the memory block BLK' may include first to third sub-blocks SUB_BLK1, SUB_BLK2, and SUB_BLK3'.

Unlike the third sub-block SUB_BLK3 of FIG. 8, the third sub-block SUB_BLK3' may further include a reserved region. The size of the third sub-block SUB_BLK3' may be s3' and the size of the reserved region may be rs3. s3' may be less than s2 and may also be less than s1.

The size ns1 of the normal region of the first sub-block SUB_BLK1 may be s3' or less and the size ns2 of the normal region of the second sub-block SUB_BLK2 may be s3' or less.

Furthermore, the valid page count of the first sub-block SUB_BLK1 may be managed to be less than or equal to the total page count of the third sub-block SUB_BLK3'. In addition, the valid page count of the second sub-block SUB_BLK2 may be managed to be less than or equal to the total page count of the third sub-block SUB_BLK3'.

According to an embodiment, since the size of valid data stored in each sub-block is managed to be less than or equal to the total page count of another sub-block, the data copying between sub-blocks may be performed efficiently.

Figure 10:
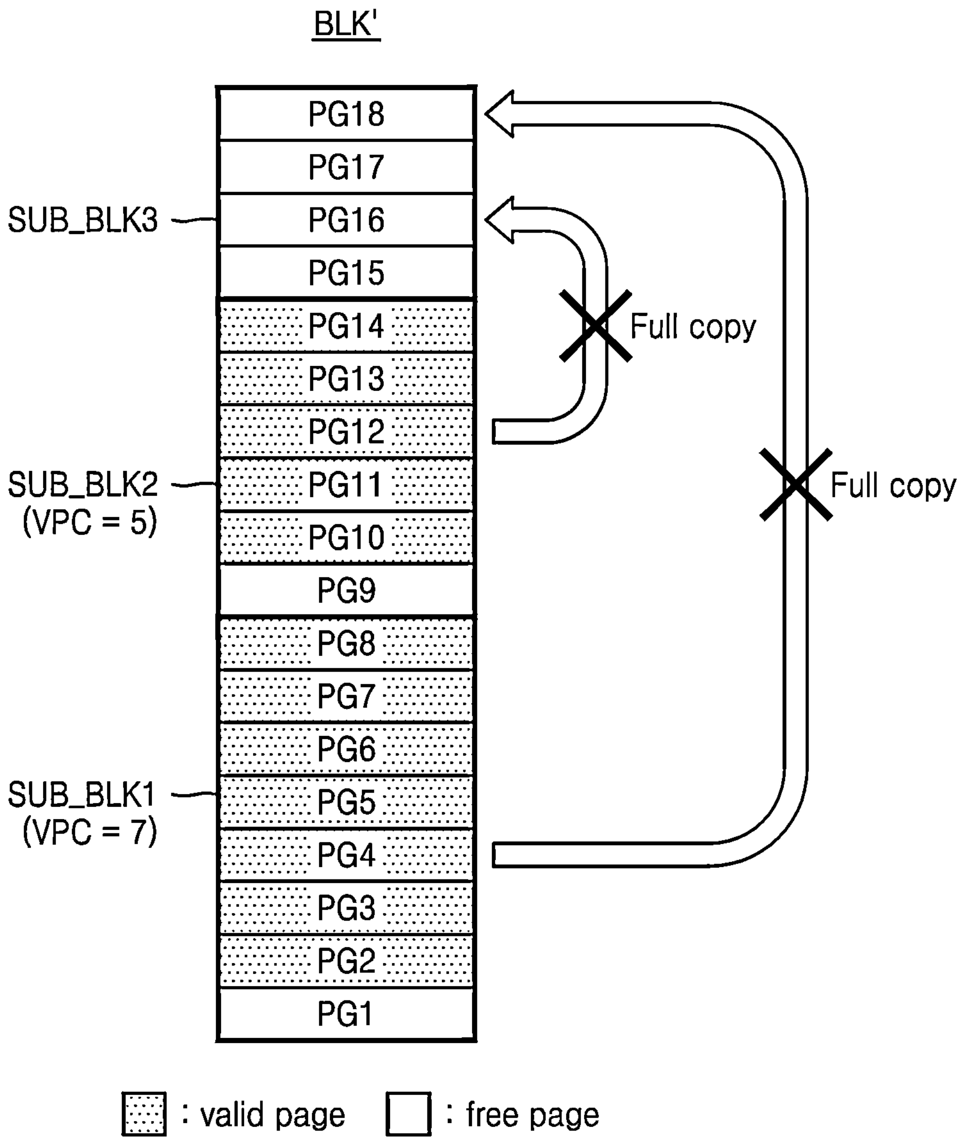
FIG. 10 is a diagram illustrating data copying between sub-blocks according to a comparative example.

FIG. 10 is a diagram illustrating data copying between sub-blocks according to a comparative example.

Referring to FIG. 10, a first sub-block SUB_BLK1 may include 1st to 8th pages PG1 to PG8, a second sub-block SUB_BLK2 may include 9th to 14th pages PG9 to PG14, and a third sub-block SUB_BLK3 may include 15th to 18th pages PG15 to PG18.

In the first sub-block SUB_BLK1, the 1st page PG1 may include a free page and the 2nd to 8th pages PG2 to PG8 may include valid pages. Accordingly, the valid page count (VPC) of the first sub-block SUB_BLK1 may be 7.

In the second sub-block SUB_BLK2, the 9th page PG9 may include a free page and the 10th to 14th pages PG10 to PG14 may include valid pages. Accordingly, the VPC of the second sub-block SUB_BLK2 may be 5.

In the third sub-block SUB_BLK3, the 15th to 18th pages PG15 to PG18 may include free pages. Accordingly, the total page count of the third sub-block SUB_BLK3 may be 4.

Since the VPC of the first sub-block SUB_BLK1 is greater than the total page count of the third sub-block SUB_BLK3, valid data of the first sub-block SUB_BLK1 may not be entirely copied to the third sub-block SUB_BLK3. Also, since the VPC of the second sub-block SUB_BLK2 is greater than the total page count of the third sub-block SUB_BLK3, valid data of the second sub-block SUB_BLK2 may not be entirely copied to the third sub-block SUB_BLK3. Some pieces of the valid data stored in the first sub-block SUB_BLK1 or the second sub-block SUB_BLK2 need to be copied to another sub-block. Accordingly, since the addresses of a plurality of sub-blocks have to be secured to access the copied data, the complexity of address mapping may increase.

Figure 11:
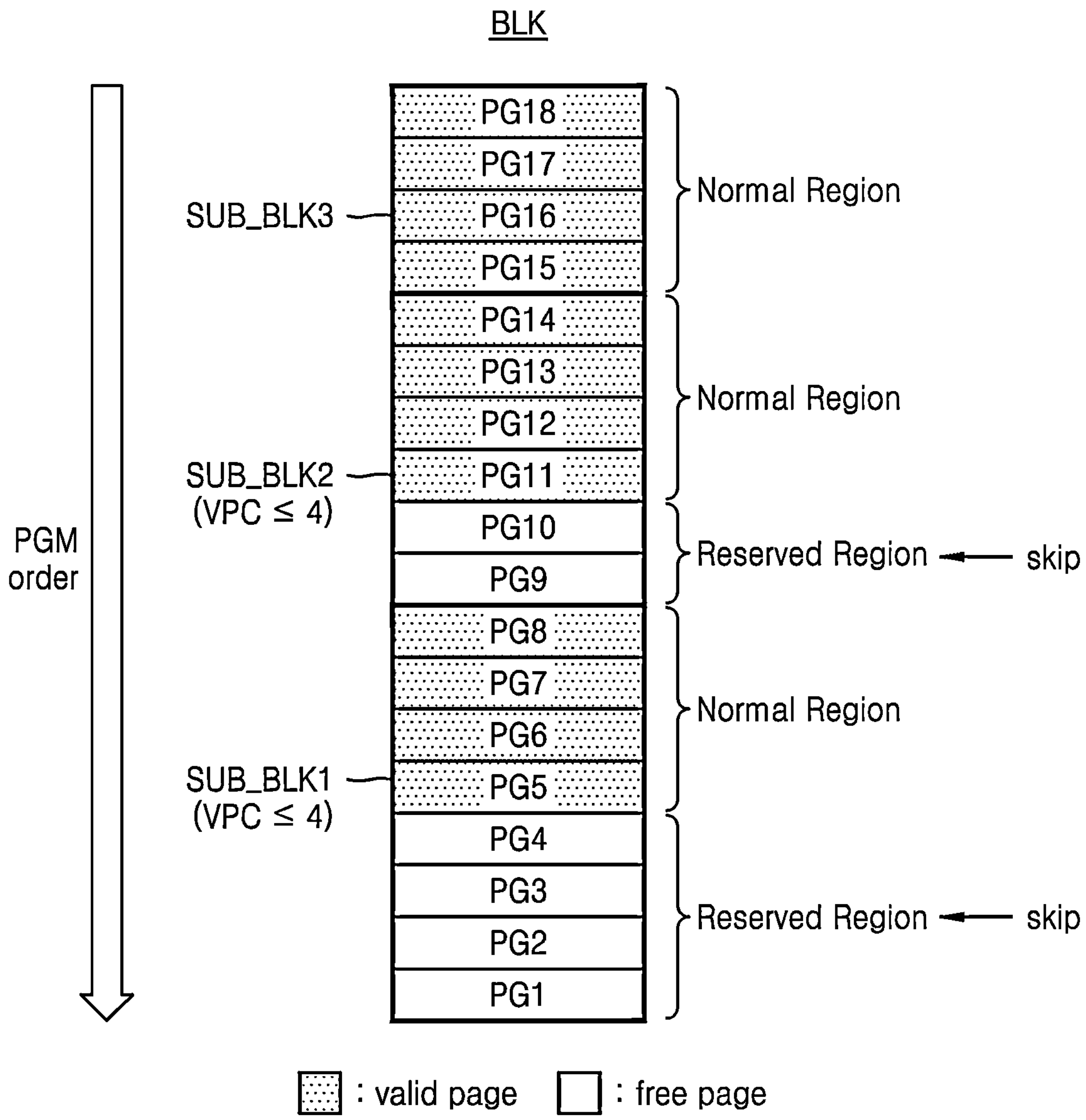
FIG. 11 is a diagram illustrating a program operation of a memory block according to an embodiment.

FIG. 11 is a diagram illustrating a program operation of a memory block BLK according to an embodiment.

Referring to FIG. 11, the memory block BLK may have the structure of FIG. 8, but the embodiment is not limited thereto. The memory block BLK may have the structure shown in FIG. 9.

The memory block BLK may include first to third sub-blocks SUB_BLK1 to SUB_BLK3.

In the first sub-block SUB_BLK1, the reserved region may include 1st to 4th pages PG1 to PG4 and the normal region may include 5th to 8th pages PG5 to PG8.

In the second sub-block SUB_BLK2, the reserved region may include 9th to 10th pages PG9 to PG10 and the normal region may include 11th to 14th pages PG11 to PG14.

The normal region of the third sub-block SUB_BLK3 may include 15th to 18th pages PG15 to PG18.

For the memory block BLK, program operations may be performed according to the order of pages in the normal regions of the first to third sub-blocks SUB_BLK1 to SUB_BLK3. For example, program operations may be performed in the order of 18th to 11th pages and 8th to 5th pages PG18 to PG11 and PG8 to PG5. That is, program operations for 1st to 4th, 9th, and 10th pages PG1 to PG4, PG9, and PG10 in the reserved regions may be skipped. Specifically, the 8th page PG8 rather than the 10th page PG10 may be programmed after the 11th page PG11.

Referring to FIG. 11, the size of the normal region of the first sub-block SUB_BLK1 may be less than or equal to the size of the third sub-block SUB_BLK3. The size of the normal region of the second sub-block SUB_BLK2 may be less than or equal to the size of the third sub-block SUB_BLK3.

In other words, each of the VPC of the first sub-block SUB_BLK1 and the VPC of the second sub-block SUB_BLK2 may be less than or equal to 4, which is the total page count of the third sub-block SUB_BLK3. When the free page count of the normal region of the first sub-block SUB_BLK1 is 0 and some pieces of data stored in the normal region of the first sub-block SUB_BLK1 is invalidated, data may be stored in the reserved region of the first sub-block SUB_BLK1. When the free page count of the normal region of the second sub-block SUB_BLK2 is 0 and some pieces of data stored in the normal region of the second sub-block SUB_BLK2 is invalidated, data may be stored in the reserved region of the second sub-block SUB_BLK2. Therefore, the VPCs of the first and second sub-blocks SUB_BLK1 and SUB_BLK2 may be maintained at a value less than or equal to 4, which is the size of the normal region of the third sub-block SUB_BLK3.

Figure 12:
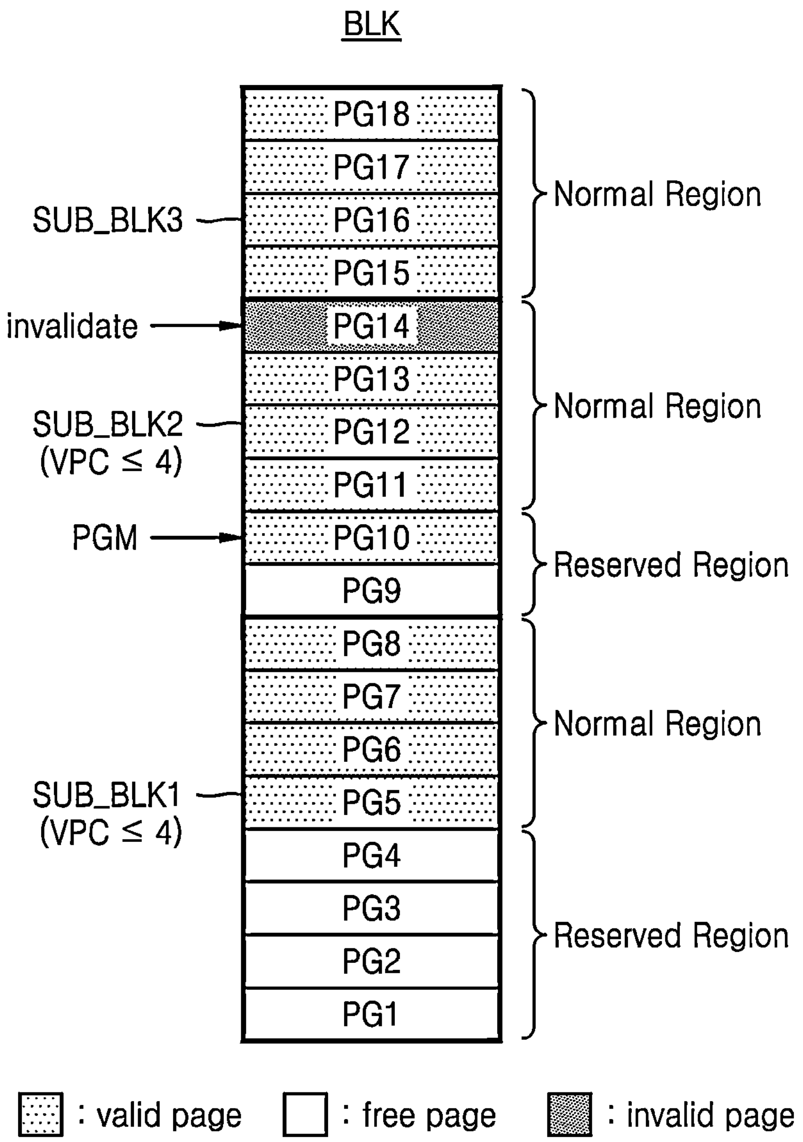
FIG. 12 is a diagram illustrating a subsequent program operation for a reserved region.

FIG. 12 is a diagram illustrating a subsequent program operation for a reserved region.

Referring to FIG. 12, a program operation for the memory block BLK may be performed on a 10th page PG10 in the reserved region of the second sub-block SUB_BLK2.

Specifically, when invalidation is performed on a 14th page PG14 in the second sub-block SUB_BLK2, a subsequent program operation may be performed on the reserved region of the second sub-block SUB_BLK2.

In some embodiments, a subsequent program operation may be performed on the 9th page PG9 rather than the 10th page PG10.

That is, subsequent program operations may be performed such that the VPC of the second sub-block SUB_BLK2 is maintained at 4 or less.

The descriptions given above for the second sub-block SUB_BLK2 may also be applied to the first sub-block SUB_BLK1.

Figure 13:
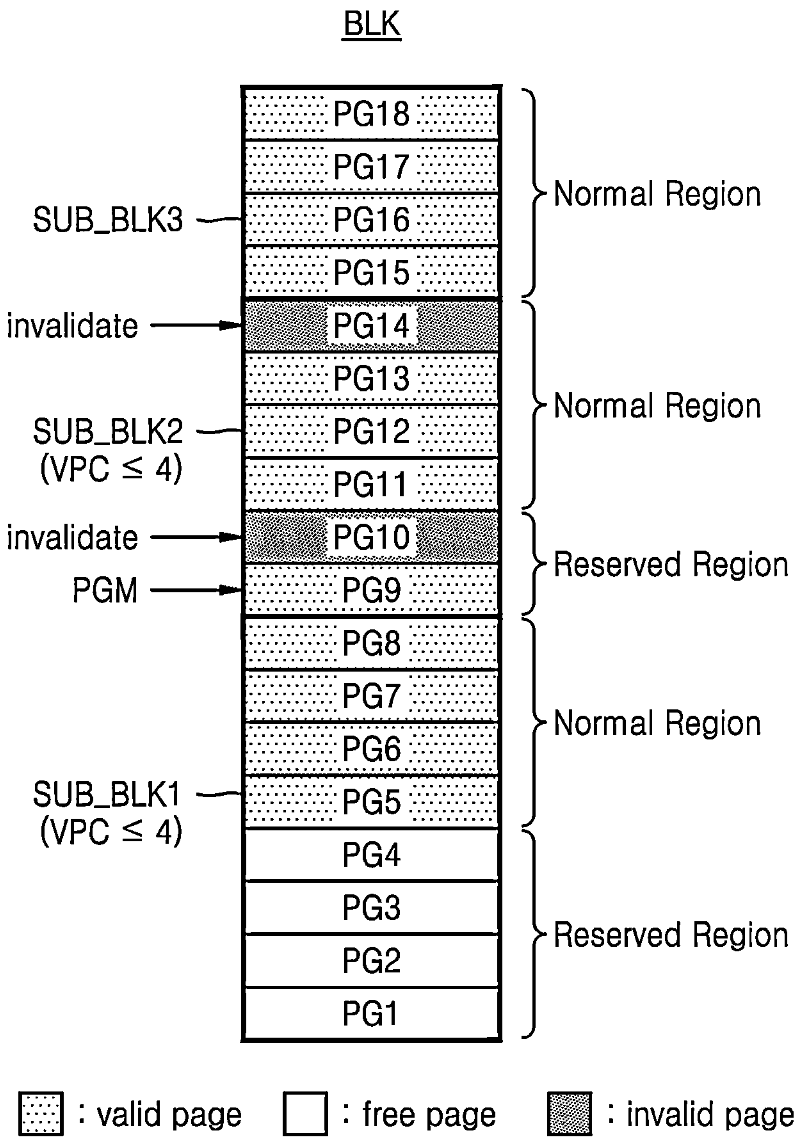
FIG. 13 is a diagram illustrating a program operation following the program operation of FIG. 12.

FIG. 13 is a diagram illustrating a program operation following the program operation of FIG. 12.

Referring to FIG. 13, a subsequent program operation for the memory block BLK may be performed on the 9th page PG9.

Specifically, when invalidation is performed on the 10th page PG10 in the second sub-block SUB_BLK2, a subsequent program operation may be performed on the reserved region of the second sub-block SUB_BLK2.

In some embodiments, when the reserved region of the second sub-block SUB_BLK2 includes a page other than the 9th and 10th pages PG9 and PG10, a subsequent program operation may be performed on that page.

That is, subsequent program operations may be performed such that the VPC of the second sub-block SUB_BLK2 is maintained at 4 or less.

The descriptions given above for the second sub-block SUB_BLK2 may also be applied to the first sub-block SUB_BLK1.

Figure 14:
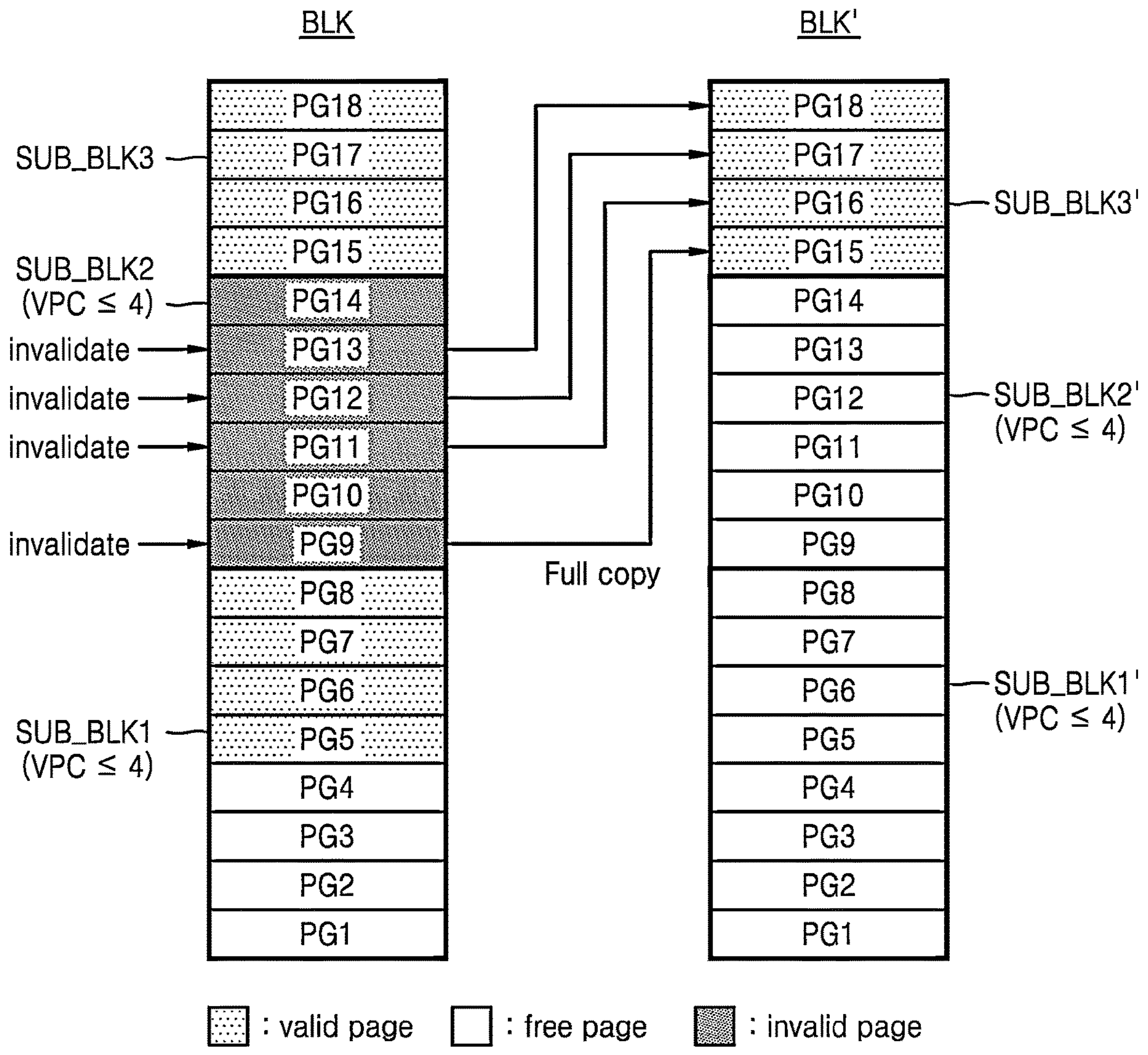
FIG. 14 is a diagram illustrating a sub-block copy operation performed after the program operation of FIG. 13.

FIG. 14 is a diagram illustrating a sub-block copy operation performed after the program operation of FIG. 13.

Referring to FIG. 14, the structure of a memory block BLK' may be the same as that of the memory block BLK. That is, the VPCs of first to third sub-blocks SUB_BLK1' to SUB_BLK3' of the memory block BLK' may be managed to be 4 or less. Also, the third sub-block SUB_BLK3' may include a normal region, and each of the first and second sub-blocks SUB_BLK1' and SUB_BLK2' may include both a normal region and a reserved region. The size of the normal region of each of the first and second sub-blocks SUB_BLK1' and SUB_BLK2' may be less than or equal to the size of the normal region of the third sub-block SUB_BLK3'.

Referring to FIG. 13, the 9th and 11th to 13th pages PG9 and PG11 to PG13 of the second sub-block SUB_BLK2 in the memory block BLK may include valid pages.

During a sub-block copy operation, data stored in the 9th and 11th to 13th pages PG9 and PG11 to PG13 of the second sub-block SUB_BLK2 of the memory block BLK may be fully copied to the third sub-block SUB_BLK3' of the memory block BLK'.

The 9th and 11th to 13th pages PG9 and PG11 to PG13 in the memory block BLK may be managed as invalid pages, and the 15th to 18th pages PG15 to PG18 in the memory block BLK' may be managed as valid pages.

However, the embodiment is not limited thereto, and data stored in the 9th and 11th to 13th pages PG9 and PG11 to PG13 of the second sub-block SUB_BLK2 in the memory block BLK may be fully copied to the first or second sub-blocks SUB_BLK1' or SUB_BLK2' in the memory block BLK'. Also, the first or third sub-block SUB_BLK1 or SUB_BLK3 of the memory block BLK may be erased in a unit of sub-block. The data stored in the 9th and 11th to 13th pages PG9 and PG11 to PG13 of the second sub-block SUB_BLK2 of the memory block BLK may be fully copied to the first or third sub-block SUB_BLK1 or SUB_BLK3 of the memory block BLK.

According to an embodiment, the number of valid pages in each sub-block may be managed to be less than the number of total pages in the smallest sub-block. Accordingly, overall data copy between sub-blocks may be performed efficiently.

Figure 15:
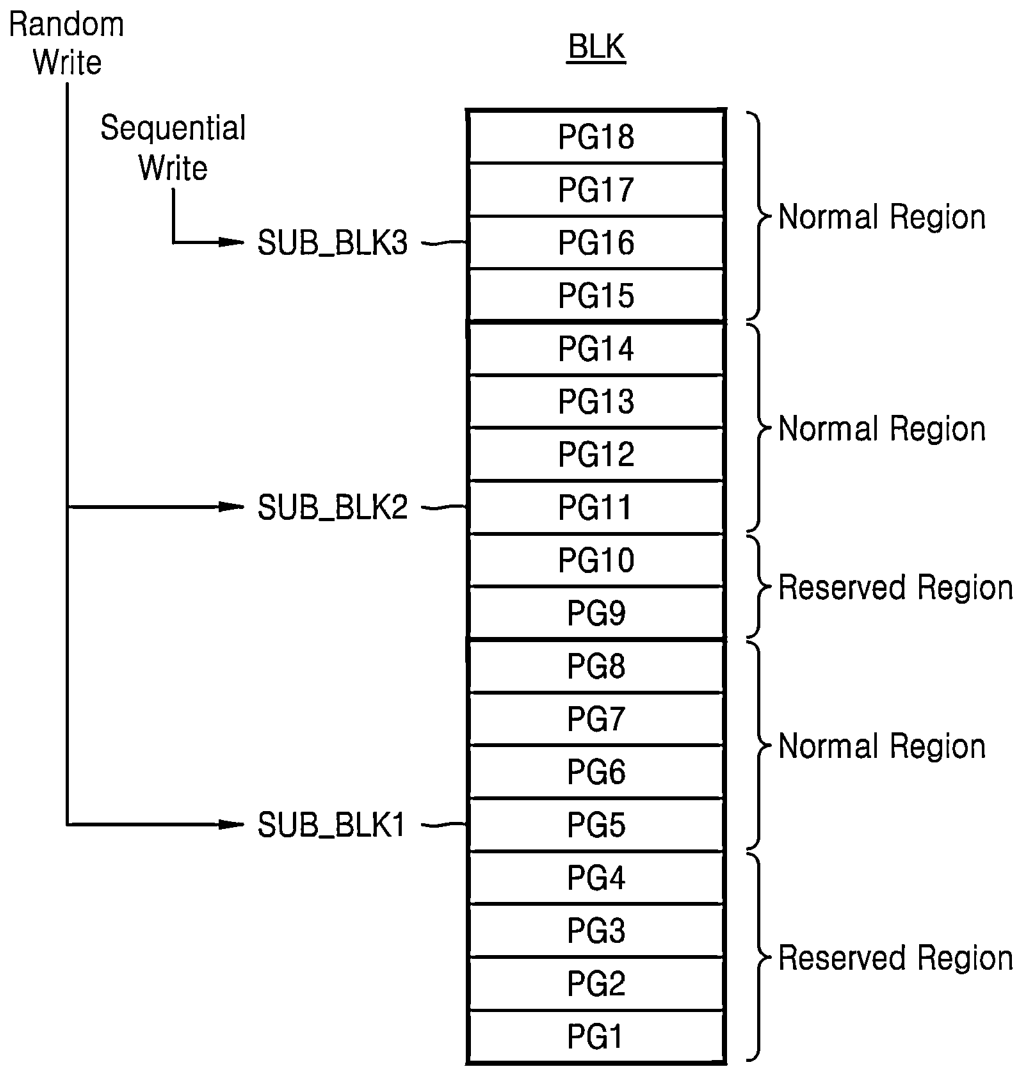
FIG. 15 is a diagram illustrating sequential write and random write according to an embodiment.

FIG. 15 is a diagram illustrating sequential write and random write according to an embodiment. FIG. 15 may be described with reference to FIG. 1.

Referring to FIG. 1, the storage controller 11 may determine the type of write request received from the host 20. The type of write request may include sequential write (i.e., a sequential write request) or random write (i.e., a random write request). The sequential write may include an operation of writing data to consecutive address regions and the random write may include an operation of writing data to discontinuous address regions.

Depending on the type of write request, the storage controller 11 may select a sub-block to be programmed on the basis of the size of a reserved region (e.g., an erase state region of the reserved region). For example, during the sequential write, the storage controller 11 may program data into a sub-block with the relatively small number of free pages in the reserved region. For example, during the sequential write, the storage controller 11 may program data into a sub-block having a relatively small erase state region. During the random write, the storage controller 11 may program data into a sub-block with the relatively large number of free pages in the reserved region. For example, during the random write, the storage controller 11 may program data into a sub-block having a relatively large erase state region.

In FIG. 15, the sequential write may be performed on the third sub-block SUB_BLK3 having no reserved region and the random write may be performed on the first and second sub-blocks SUB_BLK1 and SUB_BLK2 on the basis of the number of free pages in the reserved region. That is, the random write may be performed on a sub-block with a large number of free pages in the reserved region.

Since overwrite is impossible due to the characteristics of NAND operation, fragmentation of memory blocks may occur during the random write. According to an embodiment, when random write update occurs in the normal region, data may be programmed in the reserved region within the same sub-block. In other words, block fragmentation may be limited to specific sub-blocks, and thus, the garbage collection speed and random write performance may be improved.

Figure 16:
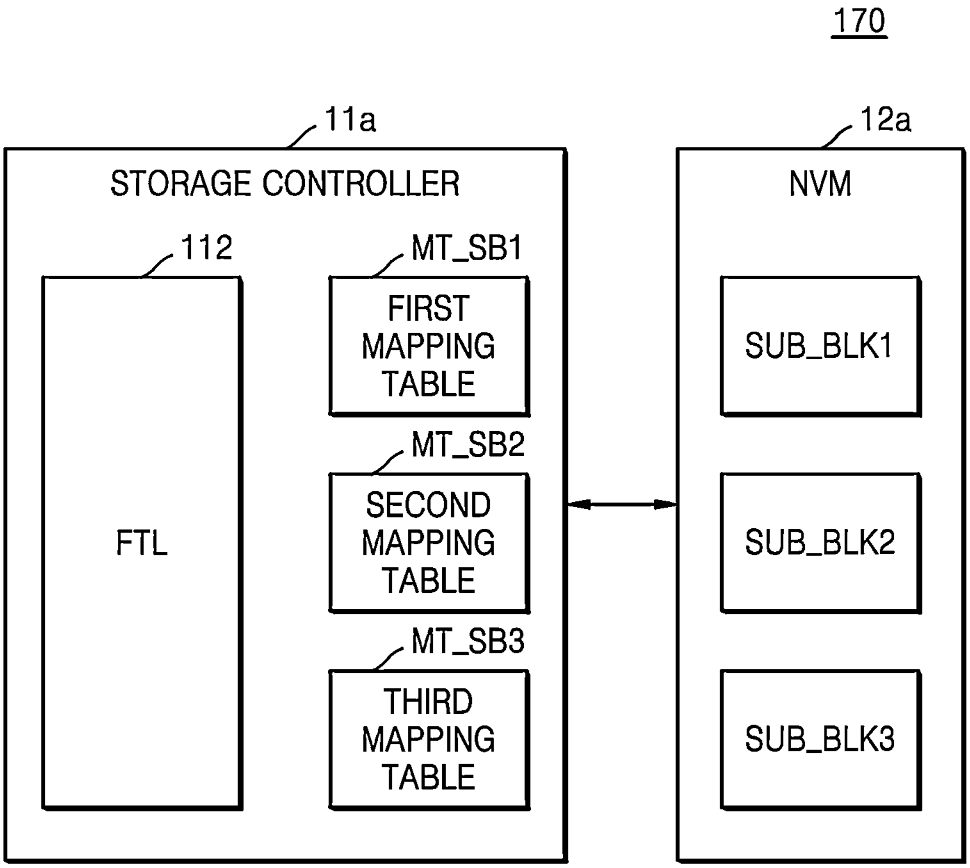
FIG. 16 is a block diagram showing a storage device according to an embodiment.

FIG. 16 is a block diagram showing a storage device 170 according to an embodiment.

Referring to FIG. 16, the storage device 170 may include a storage controller 11*a* and a non-volatile memory 12*a* and may correspond to an example of the storage device 10 of FIG. 1. The non-volatile memory 12*a* may include a plurality of memory blocks each including first to third sub-blocks SUB_BLK1, SUB_BLK2, and SUB_BLK3 having different sizes.

The storage controller 11*a* may include an FTL 112 and first to third mapping tables MT_SB1, MT_SB2, and MT_SB3. For example, the first to third mapping tables MT_SB1, MT_SB2, and MT_SB3 may be loaded into operating memory within the storage controller 11*a*, for example, SRAM or DRAM. The first mapping table MT_SB1 may correspond to the first sub-block SUB_BLK1, the second mapping table MT_SB2 may correspond to the second sub-block SUB_BLK2, and the third mapping table MT_SB3 may correspond to the third sub-block SUB_BLK3.

In an embodiment, during an address mapping operation, the FTL 112 may set the amounts of logical addresses allocated to the first to third mapping tables MT_SB1, MT_SB2, and MT_SB3 to the same value. This is described in detail with reference to FIG. 17. However, the embodiment is not limited thereto. In some embodiments, during an address mapping operation, the FTL 112 may set the amounts of logical addresses allocated to the first to third mapping tables MT_SB1, MT_SB2, and MT_SB3 to different values.

Figure 17:
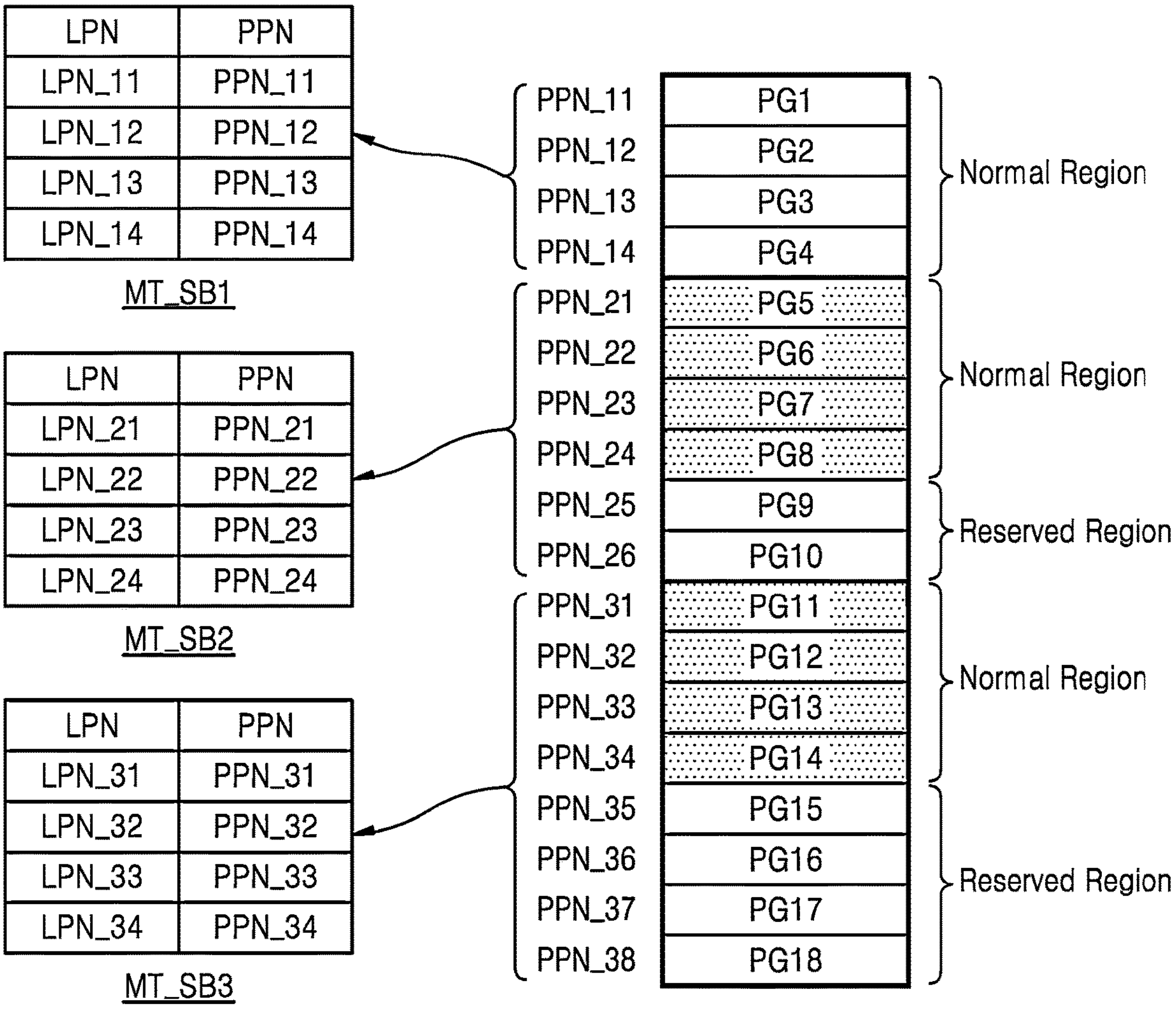
FIG. 17 shows an example of mapping tables respectively corresponding to a plurality of sub-blocks according to an embodiment.

FIG. 17 shows an example of mapping tables respectively corresponding to a plurality of sub-blocks according to an embodiment.

Referring to FIGS. 16 and 17 together, in the first to third mapping tables MT_SB1, MT_SB2, and MT_SB3, the logical address may correspond to a logical page number LPN and the physical address may correspond to a physical page number PPN. The FTL 112 may allocate four logical page numbers LPN_11 to LPN_14 to the first mapping table MT_SB1, allocate four logical page numbers LPN_21 to LPN_24 to the second mapping table MT_SB2, and allocate four logical page numbers LPN_31 to LPN_34 to the third mapping table MT_SB3.

For example, four logical page numbers LPN_11 to LPN_14 may be mapped to four physical page numbers PPN_11 to PPN_14 of the first sub-block SUB_BLK1, respectively.

For example, the four logical page numbers LPN_21 to LPN_24 may be mapped to four physical page numbers PPN_21 to PPN_24, respectively, among six physical page numbers PPN_21 to PPN_26 of the second sub-block SUB_BLK2. However, the embodiment is not limited thereto, and any four physical page numbers among the six physical page numbers PPN_21 to PPN_26 may be respectively mapped to four logical page numbers LPN_21 to LPN_24. If an invalid page exists in the normal region, the physical page number corresponding to the invalid page may be unmapped from the logical page number. When the free page count in the normal region is 0 and there are invalid pages in the normal region, the physical page numbers PPN_25 and PPN_26 of the reserved region may be mapped to logical page numbers.

For example, the four logical page numbers LPN_31 to LPN_34 may be mapped to four physical page numbers PPN_31 to PPN_34, respectively, among eight physical page numbers PPN_31 to PPN_38 of the third sub-block SUB_BLK3. However, the embodiment is not limited thereto, and any four physical page numbers among the eight physical page numbers PPN_31 to PPN_38 may be respectively mapped to four logical page numbers LPN_31 to LPN_34. If an invalid page exists in the normal region, the physical page number corresponding to the invalid page may be unmapped from the logical page number. When the free page count in the normal region is 0 and there are invalid pages in the normal region, the physical page numbers PPN_35 and PPN_38 of the reserved region may be mapped to logical page numbers.

According to an embodiment, even if the first to third sub-blocks SUB_BLK1 to SUB_BLK3 have different physical sizes, the first to third sub-blocks SUB_BLK1 to SUB_BLK3 may be managed to have the same logical size.

Even if the first to third sub-blocks SUB_BLK1 to SUB_BLK3 have different physical sizes, data copy is performed based on the logical address. Accordingly, the complexity of management and firmware for performing garbage collection and wear leveling may be lowered, and thus, the performance of the storage device 170 may be improved.

Figure 19:
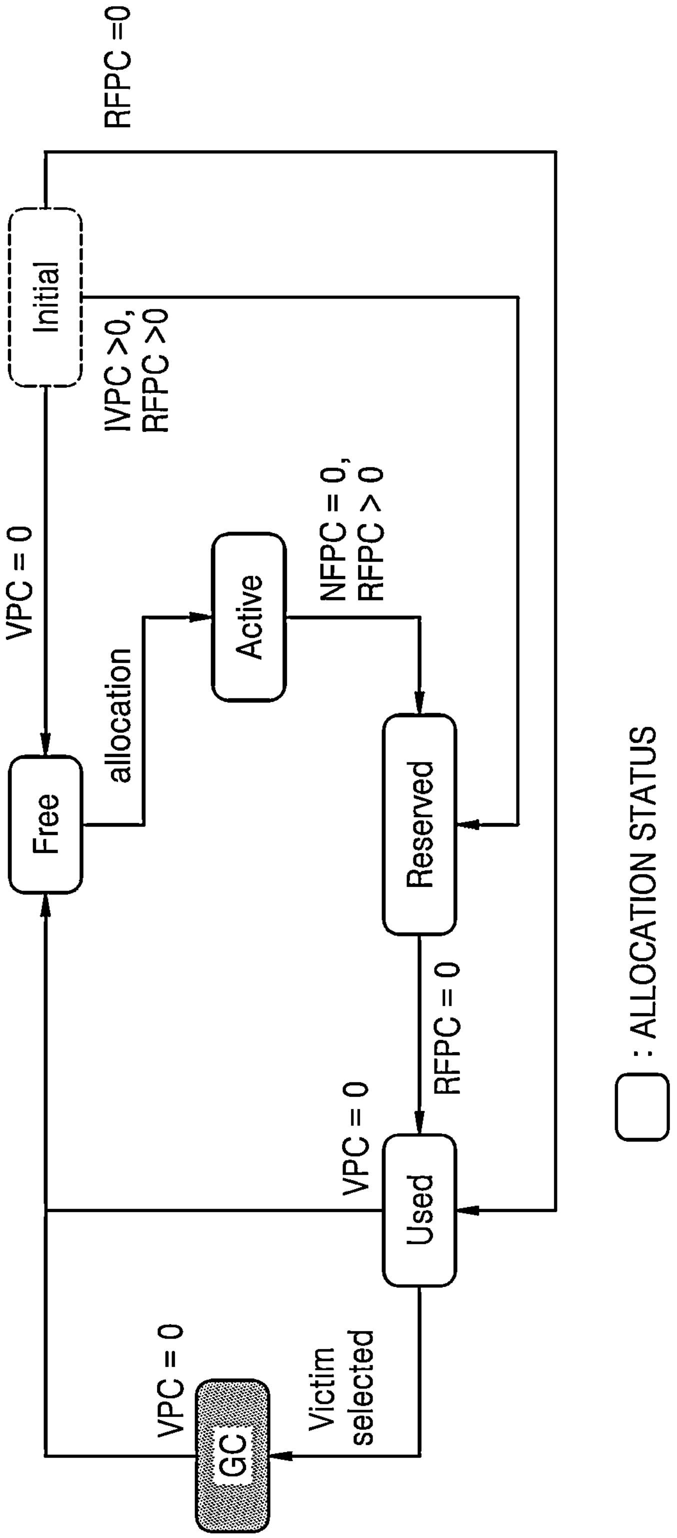
FIG. 19 is a diagram showing allocation status of sub-blocks.

FIG. 18 is a diagram illustrating a sub-block allocation table according to an embodiment. FIG. 19 is a diagram showing allocation status of sub-blocks.

Referring to FIG. 18, a sub-block allocation table SBAT may represent the allocation status for the first to third sub-blocks SUB_BLK1 to SUB_BLK3. The storage controller 11 may manage the sub-block allocation table SBAT, and the sub-block allocation table SBAT may be loaded into operating memory within the storage controller 11, for example, SRAM or DRAM.

Referring to FIGS. 18 and 19, the allocation status of a sub-block may include 'Free,' 'Active,' 'Reserved,' and 'Used.'

The storage controller 11 may manage a page table to control the allocation status of sub-blocks. The page table may include the number of free pages in the normal region of the sub-block (NFPC), the number of free pages in the reserved region of the sub-block (RFPC), the number of valid pages in the sub-block, i.e., the VPC, and the number of invalid pages in the sub-block, i.e., the invalid page count (IVPC). The page table may be loaded into operating memory within the storage controller 11, for example, SRAM or DRAM.

In an initial state, if the VPC is 0, the storage controller 11 may update the allocation status of the sub-block to Free by performing an erase operation on the sub-block. In the initial state, if the IVPC is greater than 0 and the RFPC is greater than 0, the storage controller 11 may update the allocation status of the sub-block to Reserved. For a sub-block in the Reserved state, the storage controller 11 may perform a program operation in the reserved region of the corresponding sub-block. In the initial state, if the RFPC is 0, the storage controller 11 may update the allocation status of the sub-block to Used. The storage controller 11 may select a sub-block in a Used state as a victim block for garbage collection GC.

The storage controller 11 may update the allocation status of the sub-block to Active by allocating the physical address corresponding to the normal region of the sub-block in the Free state to the logical address. For example, the storage controller 11 may create mapping tables (e.g., MT_SB1 to MT_SB3 in FIG. 16) for sub-blocks that are in the Free state.

If the NFPC of a sub-block in the Active state is 0 and the RFPC thereof is greater than 0, the storage controller 11 may update the allocation status of the sub-block to Reserved. For the sub-block in the Reserved state, the storage controller 11 may perform a program operation in the reserved region of the corresponding sub-block. That is, the storage controller 11 may update the allocation status of the sub-block to Reserved by allocating the physical address corresponding to the reserved region of the sub-block to the logical address.

If the RFPC of a sub-block in Reserved state is 0, the storage controller 11 may update the allocation status of the sub-block to Used. The storage controller 11 may select a sub-block in a Used state as a victim block for garbage collection GC.

Figure 20:
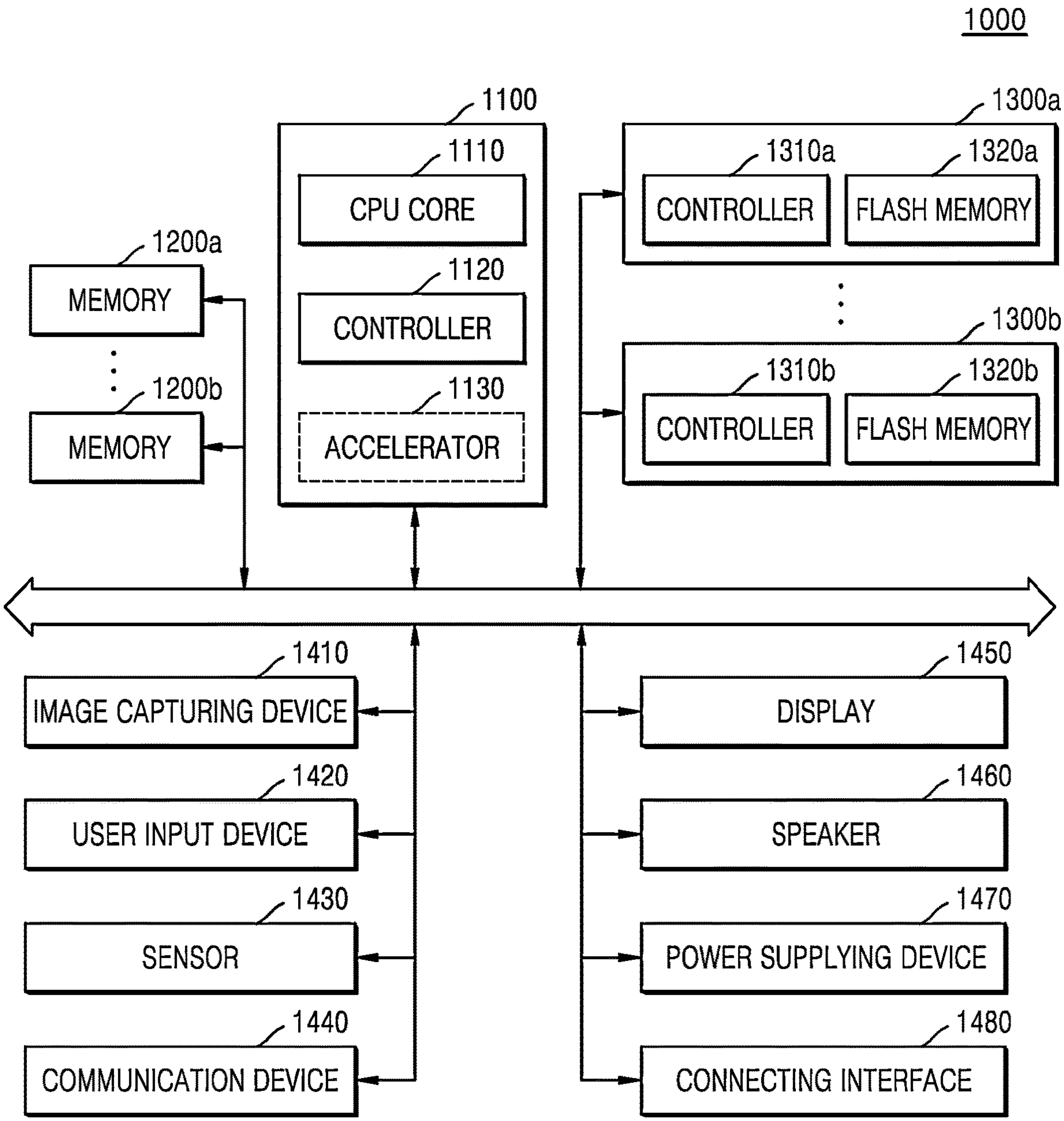
FIG. 20 shows a system to which a storage device according to an embodiment is applied.

FIG. 20 shows a system 1000 to which a storage device according to an embodiment is applied. The system 1000 of FIG. 20 may basically include mobile systems, such as a portable mobile phone, a smartphone, a tablet personal computer (PC), a wearable device, a healthcare device, or an internet of things (IoT) device. However, the system 1000 of FIG. 20 is not necessarily limited to the mobile systems described above and may include a personal computer, a laptop, a server, a media player, an automotive device, such as a navigation unit, or the like.

Referring to FIG. 20, the system 1000 may include a main processor 1100, memories 1200*a* and 1200*b*, and storage devices 1300*a* and 1300*b*, and may further include one or more of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, and more specifically, the operation of all other components that constitute the system 1000. This main processor 1100 may be provided as a general-purpose processor, a dedicated processor, or an application processor.

The main processor 1100 may include one or more CPU cores 1110 and may further include a controller 1120 for controlling the memories 1200*a* and 1200*b* and/or the storage devices 1300*a* and 1300*b*. According to an embodiment, the main processor 1100 may further include an accelerator 1130, which includes a dedicated circuit for high-speed data computation, such as artificial intelligence (AI) data computation. The accelerator 1130 may include a graphics processing unit (GPU), an neural processing unit (NPU), and/or a data processing unit (DPU) and may be provided as a separate chip physically independent from other components of the main processor 1100.

The memories 1200*a* and 1200*b* may be used as main memory devices of the system 1000 and include volatile memory, such as SRAM and/or DRAM. However, the memories 1200*a* and 1200*b* may also include non-volatile memory, such as flash memory, PRAM, and/or resistive random access memory (RRAM). The memories 1200*a* and 1200*b* may also be provided in the same package as the main processor 1100.

The storage devices 1300*a* and 1300*b* may function as non-volatile storage devices for storing data regardless of whether power is supplied or not and may have storage capacities relatively greater than those of the memories 1200*a* and 1200*b*. The storage devices 1300*a* and 1300*b* may respectively include storage controllers 1310*a* and 1310*b* and non-volatile memories 1320*a* and 1320*b* that store data under the control of the storage controllers 1310*a* and 1310*b*. The non-volatile memories 1320*a* and 1320*b* may include flash memory with a 2-dimensional (2D) structure or a 3-dimensional (3D) vertical NAND (V-NAND) structure but may also include other types of non-volatile memory, such as PRAM and/or RRAM.

The storage devices 1300*a* and 1300*b* may be provided in the system 1000 while being physically separated from the main processor 1100 or may be provided in the same package as the main processor 1100. In addition, the storage devices 1300*a* and 1300*b* may have a form of an SSD or a memory card and may be thus detachably coupled to other components of the system 1000 via an interface, such as the connecting interface 1480 described below. The storage devices 1300*a* and 1300*b* may include devices to which standard regulations, such as UFS, eMMC, and NVMe, are applied, but the embodiment is not necessarily limited thereto.

The image capturing device 1410 may capture still images or moving images and may include a camera, a camcorder, and/or a webcam. The user input device 1420 may receive various types of data input from a user of the system 1000 and may include a touch pad, a keypad, a keyboard, a mouse, and/or a microphone. The sensor 1430 may detect various types of physical quantities obtained from outside the system 1000 and convert the sensed physical quantities into electric signals. This sensor 1430 may include a temperature sensor, a pressure sensor, an illuminance sensor, a position sensor, an acceleration sensor, a biosensor, and/or a gyroscope sensor.

The communication device 1440 may transmit signals to and receive signals from other devices outside the system 1000 according to various communication protocols. This communication device 1440 may include an antenna, a transceiver, and/or a modem. The display 1450 and the speaker 1460 may function as output devices that output visual information and auditory information, respectively, to a user of the system 1000. The power supplying device 1470 may appropriately convert power supplied from a battery (not shown) built in the system 1000 and/or an external power source and may supply the converted power to each of the components of the system 1000.

The connecting interface 1480 may provide connection between the system 1000 and an external device which is connected to the system 1000 to exchange data with the system 1000. The connecting interface 1480 may be provided in various interface methods, such as advanced technology attachment (ATA), serial ATA (SATA), external SATA (e-SATA), small computer small interface (SCSI), serial attached SCSI (SAS), peripheral component interconnection (PCI), PCI express (PCIe), NVM express, IEEE 1394, universal serial bus (USB), a secure digital (SD) card, a multi-media card (MMC), an eMMC, UFS, embedded universal flash storage (eUFS), and a compact flash (CF) card.

The storage devices 1300*a* and 1300*b* of FIG. 20 may correspond to (e.g., may be) the storage device 10 described above with reference to FIGS. 1 to 19.

While the inventive concept has been particularly shown and described with reference to embodiments thereof, it will be understood that various changes in form and details may be made therein without departing from the scope of the following claims.

What is claimed is:

1. A non-volatile memory device comprising a plurality of sub-blocks having different sizes and arranged in a vertical direction above a substrate, wherein a first sub-block and a second sub-block among the plurality of sub-blocks each comprises a normal region and a reserved region configured to store data after at least some pieces of data stored in the normal region are invalidated, wherein a third sub-block among the plurality of sub-blocks has a smallest size among the different sizes, and wherein a size of the normal region of each of the first sub-block and the second sub-block is equal to or less than the size of the third sub-block.

2. The non-volatile memory device of claim 1, wherein a size of valid pages stored in each of the first sub-block and the second sub-block is equal to or less than the size of the third sub-block.

3. The non-volatile memory device of claim 1, further comprising a control logic circuit configured to control program operations of the plurality of sub-blocks, wherein the control logic circuit is configured to, for the each of the first sub-block and the second sub-block, program data in the reserved region when a number of free pages in the normal region is 0 and at least some pieces of data stored in the normal region are invalidated.

4. The non-volatile memory device of claim 1, further comprising a control logic circuit configured to control program operations of the plurality of sub-blocks, wherein the control logic circuit is configured to program, during a program operation of data having a size greater than a sum of the size of the third sub-block and the size of the normal region of the second sub-block, a first piece of data corresponding to the size of the third sub-block in the third sub-block, and a second piece of data corresponding to the size of the normal region of the second sub-block in the normal region of the second sub-block, and data other than the first and second pieces of data in the normal region of the first sub-block.

5. The non-volatile memory device of claim 1, wherein the plurality of sub-blocks respectively correspond to a plurality of memory stacks extending in the vertical direction above the substrate.

6. The non-volatile memory device of claim 5,
wherein the normal region comprises a memory cell having a first channel hole size among memory cells respectively corresponding to the plurality of memory stacks,
wherein the reserved region comprises a memory cell having a second channel hole size among the memory cells respectively corresponding to the plurality of memory stacks, and
wherein the second channel hole size is smaller than the first channel hole size.

7. The non-volatile memory device of claim 5,
wherein the normal region comprises a memory cell having a first distance from the substrate in the vertical direction among memory cells respectively corresponding to the plurality of memory stacks,
wherein the reserved region comprises a memory cell having a second distance from the substrate in the vertical direction among the memory cells respectively corresponding to the plurality of memory stacks, and
wherein the first distance is greater than the second distance.

8. The non-volatile memory device of claim 5,
wherein the normal region comprises a memory cell having a first charge storage layer thickness among memory cells respectively corresponding to the plurality of memory stacks,
wherein the reserved region comprises a memory cell having a second charge storage layer thickness among the memory cells respectively corresponding to the plurality of memory stacks, and
wherein the first charge storage layer thickness is greater than the second charge storage layer thickness.

9. The non-volatile memory device of claim 5, wherein the reserved region comprises a memory cell, among memory cells respectively corresponding to the plurality of memory stacks, which is connected to a word line connected to at least one of a plurality of junctions of the memory stacks.

10. The non-volatile memory device of claim 1, wherein numbers of bits of data stored in memory cells of the plurality of sub-blocks are equal to each other.

11. A storage device comprising:
a non-volatile memory comprising a plurality of sub-blocks having different sizes, wherein each of the plurality of sub-blocks comprises a normal region and a reserved region; and
a storage controller configured to manage a number of valid pages in a first sub-block among the plurality of sub-blocks to be less than or equal to a total number of pages in a second sub-block having a smallest size among the plurality of sub-blocks.

12. The storage device of claim 11,
wherein the storage controller is configured to manage a plurality of mapping tables respectively corresponding to the plurality of sub-blocks, and
wherein numbers of logical addresses allocated to the plurality of mapping tables are equal to each other.

13. The storage device of claim 12, wherein the numbers of logical addresses allocated to each of the plurality of mapping tables is equal to a number of physical addresses of the second sub-block having the smallest size.

14. The storage device of claim 11, wherein the storage controller is configured to control the non-volatile memory to program data in the normal region in priority to the reserved region and to program data in the reserved region after at least some pieces of data stored in the normal region are invalidated.

15. The storage device of claim 14, wherein the storage controller is configured to receive a write request from a host, select at least one of the plurality of sub-blocks based on a size of an erase state region in the reserved region, and process the write request for the selected at least one of the plurality of sub-blocks.

16. The storage device of claim 15, wherein the storage controller is configured to control the non-volatile memory, when the write request comprises a sequential write request, to perform a program operation for the write request on a sub-block having a relatively small erase state region, and when the write request comprises a random write request, to perform the program operation for the write request on a sub-block having a relatively large erase state region.

17. A non-volatile memory device comprising a plurality of stacks having different sizes and arranged in a vertical direction above a substrate,
wherein each of at least some of the plurality of stacks comprises a first storage region and a second storage region configured to store data when at least some pieces of data stored in the first storage region are invalidated, and the first storage region does not comprise an erase state storage region,
wherein a first stack among the plurality of stacks has a smallest size, and
wherein a size of the first storage region in each stack among the at least some of the plurality of stacks, different from the first stack, is less than or equal to the size of the first stack.

18. The non-volatile memory device of claim 17, wherein a number of valid pages stored in each stack among the at least some of the plurality of stacks, different from the first stack, is equal to or less than the size of the first stack.

19. The non-volatile memory device of claim 17, further comprising a control logic circuit configured to control program operations of the plurality of stacks,
wherein the control logic circuit is configured, during a program operation on data having a size greater than a size of a second stack among the plurality of stacks, to program some pieces of data corresponding to the size of the first storage region of the second stack in the first storage region of the second stack and to program other pieces of data other than the some pieces of data in the first storage region of a third stack adjacent to the second stack.

20. The non-volatile memory device of claim 17, wherein the second storage region is between, in the vertical direction, the first storage region and the substrate.

* * * * *